(12) United States Patent
Satake et al.

(10) Patent No.: US 7,428,077 B2
(45) Date of Patent: Sep. 23, 2008

(54) ELECTRONIC DEVICE CONTROLLER, AND METHOD FOR CONTROLLING ELECTRONIC DEVICE

(75) Inventors: Eiji Satake, Sapporo (JP); Kenji Kimura, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 1021 days.

(21) Appl. No.: 10/715,742

(22) Filed: Nov. 18, 2003

(65) Prior Publication Data

US 2004/0150730 A1 Aug. 5, 2004

(30) Foreign Application Priority Data

Nov. 19, 2002 (JP) .............................. 2002-335228

(51) Int. Cl.
*H04N 1/40* (2006.01)
(52) U.S. Cl. ..................... 358/443; 358/444; 358/447; 358/471
(58) Field of Classification Search ................. 358/443, 358/444, 447, 471, 486, 494
See application file for complete search history.

(56) References Cited

U.S. PATENT DOCUMENTS

| | | | |
|---|---|---|---|
| 4,910,599 A | 3/1990 | Hashimoto | |
| 5,191,426 A | 3/1993 | Kochi | |
| 5,539,532 A * | 7/1996 | Watanabe | ................... 358/443 |
| 5,684,609 A | 11/1997 | Potucek et al. | |
| 6,100,928 A | 8/2000 | Hata | |
| 6,528,962 B1 | 3/2003 | Igarashi et al. | |
| 6,748,124 B1 | 6/2004 | Nishiyama | |

FOREIGN PATENT DOCUMENTS

| | | |
|---|---|---|
| CN | 1282015 | 1/2001 |
| CN | 1320248 | 10/2001 |
| JP | 61111063 | 5/1986 |
| JP | 61-227692 | * 10/1986 |
| JP | 01258557 | 10/1989 |
| JP | 02308234 | 12/1990 |
| JP | 3177156 | 8/1991 |
| JP | 04-092557 | 3/1992 |
| JP | 04-270551 | 9/1992 |
| JP | 04306057 | 10/1992 |
| JP | 10107962 | 4/1998 |
| JP | 11-164101 | 6/1999 |
| JP | 2000050031 | 2/2000 |
| JP | 2001-103778 | 4/2001 |
| JP | 2001-158143 | 6/2001 |
| JP | 2002199160 | 7/2002 |

\* cited by examiner

*Primary Examiner*—Houshang Safaipour

(57) ABSTRACT

An electronic device controller includes an image sensor controller that controls an image sensor having an effective pixel region and a dummy pixel region, and a servo controller that performs servo control on a drive device that drives a carriage on which the image sensor is mounted. The servo controller performs the servo control based on servo control information (for speed control, initial position detection) read by some or all of the dummy pixel region of the image sensor. Alternatively, the servo control may be performed based on servo control information read by one or more separate sensors mounted on the carriage with the image sensor. Moreover, speed servo control may be performed according to speed control ranges based on servo control information for each speed range.

9 Claims, 20 Drawing Sheets

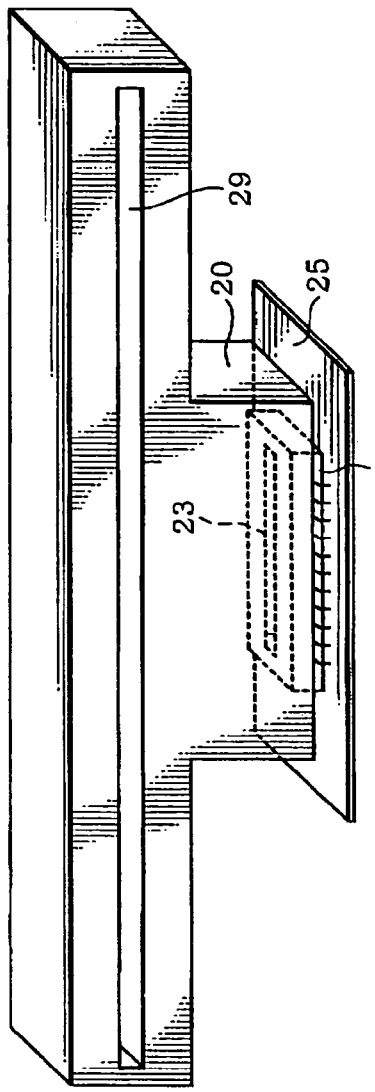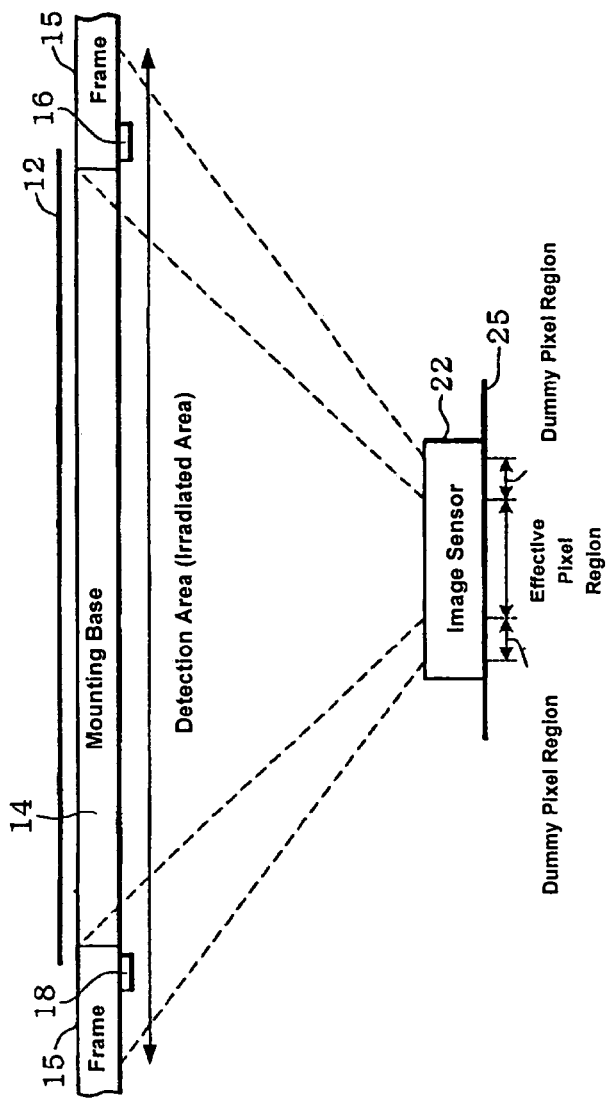
Fig. 8 (A)
Fig. 8 (B)

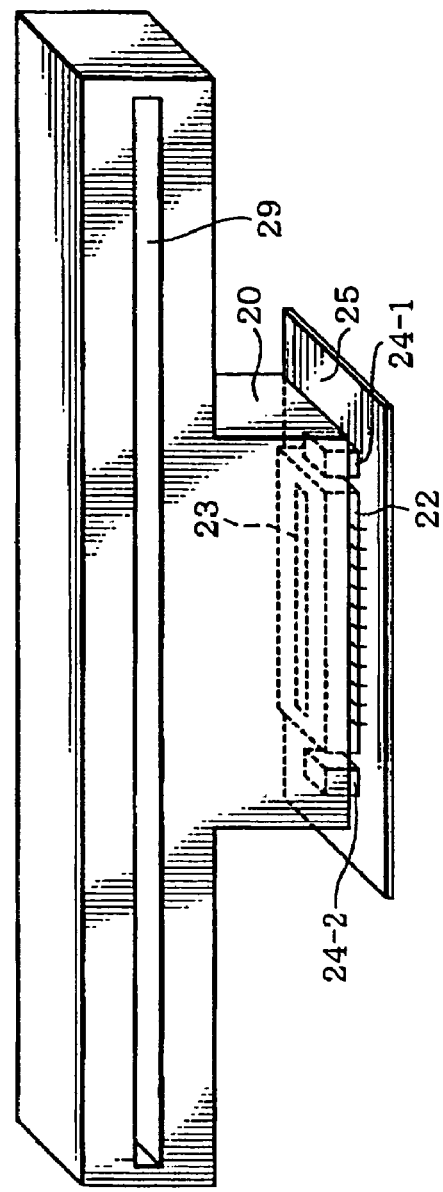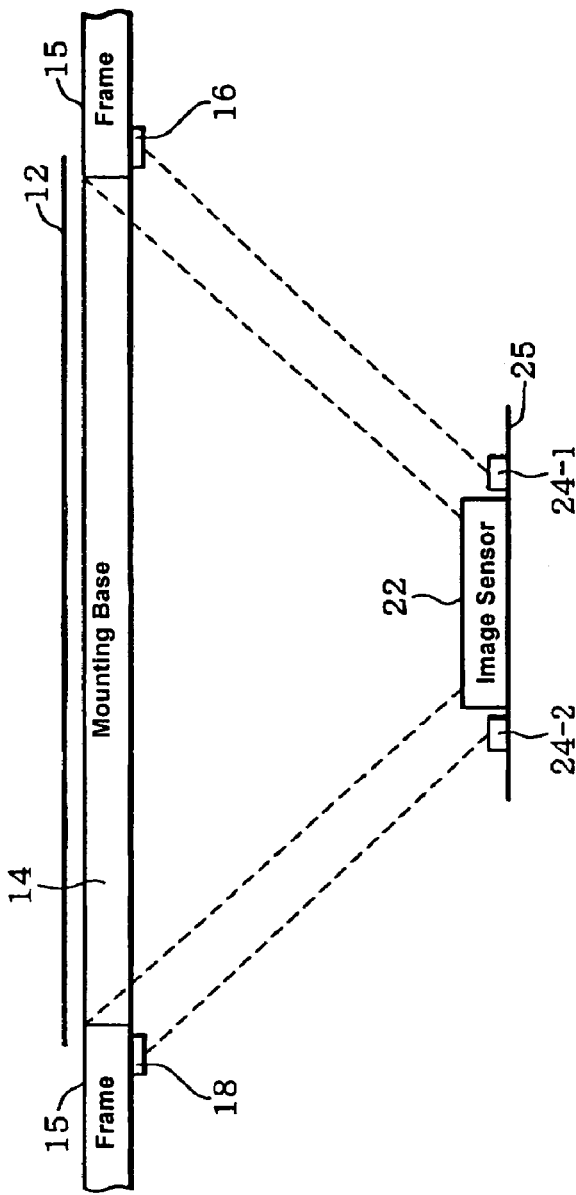
Fig. 9 (A)
Fig. 9 (B)

Fig. 18 (B)    Pattern Table

| ADR | φ1 | φ2 | ---- |
|-----|----|----|------|
| 00 | 0 | 0 | |
| 01 | 1 | 0 | |
| 02 | 1 | 0 | ---- |
| 03 | 1 | 0 | |
| 04 | 0 | 0 | |
| 05 | 0 | 1 | ---- |
| 06 | 0 | 1 | |
| 07 | 0 | 1 | ---- |
| 08 | 0 | 0 | |
| 09 | 0 | 0 | | ured
ELECTRONIC DEVICE CONTROLLER, AND METHOD FOR CONTROLLING ELECTRONIC DEVICE

RELATED APPLICATION DATA

This application is related to two applications filed concurrently herewith: (1) entitled "Image Sensor Controller, Electronic Device, and Method for Controlling Image Sensor" and identified by 10/715741; and (2) entitled "Electronic Device" and identified by 10/715735. Both of these related applications are incorporated by reference herein.

BACKGROUND OF THE INVENTION

1. Field of the Invention

The present invention relates to image sensor controllers, electronic devices, and methods for controlling image sensors.

2. Description of the Related Art

Electronic devices such as image scanners, facsimile machines and copy machines use an image sensor, i.e., Charge Coupled Device (CCD), Contact Image Sensor (CIS), or Bucket Brigade Device (BBD), to read images. A particular type of CCD (a CCD line image sensor) is usually employed in an image scanner to read images.

With a line type image sensor, image information is gathered by a light receiving section of the image sensor and supplied in the form of an image data signal to a transfer section of the image sensor. An image sensor controller supplies a transfer clock to the transfer section, and the transfer section uses that transfer clock to successively shift and transfer the image data externally. Then, the outputted analog image data is converted to digital image data, and image processing such as gamma conversion is performed.

However, conventional image scanner controllers have not made effective use of portions of a line type image sensor.

OBJECTS OF THE INVENTION

The present invention has been made in view of the technical problems described above. Accordingly, an object of the present invention is to provide more efficient electronic device controllers and methods for them, which can realize servo control with less parts.

Another object of the present invention is to provide electronic device controllers and methods for controlling an electronic device, which can make effective use of dummy pixel regions of an image sensor.

SUMMARY OF THE INVENTION

The present invention relates to a controller for an electronic device comprising an image sensor having an effective pixel region and a dummy pixel region; an image sensor controller configured to control the image sensor; and a servo controller that performs servo control of a drive device that drives a carriage based on servo control information read by at least a portion of the dummy pixel region of the image sensor.

In accordance with the invention, images are read by the image sensor through the control of the image sensor controller. Further, based on servo control information (data) read by one or more dummy pixel regions of the image sensor (for example, first and second pixel regions on opposite ends of the image sensor), the servo control is conducted for the drive device (e.g., a motor and carriage on which the sensor is mounted). As a result, dummy pixel regions of the image sensor (other than pixel regions that read images of a read object, e.g., a printed document) can be effectively used to perform the servo control, and servo control with a fewer number of parts can be realized.

The servo controller may perform the servo control based on servo control information obtained from a plurality of light receiving elements of the dummy pixel region.

In this case, predetermined processing (operations such as majority processing and average processing) may be rendered on data obtained by the plurality of light receiving elements (pixels) to obtain servo control information. When servo control information is contained in printed matter, the number or range of light receiving elements that obtain data for servo control information may be determined based on the width of the printed matter. Also, the number or range of light receiving elements that obtain data for servo control information may be determined based on light irradiation areas of a light source (which is for example mounted on a carriage) that generates light for irradiating objects to be read.

Also, in accordance with the present invention, the servo controller may perform servo control on a speed at which the image sensor (or carriage) is moved and a detected initial position based on servo control information for speed control and servo control information for initial position detection read by the dummy pixel region.

In this case, servo control information for speed control may be read by a dummy pixel region (first pixel region) on one end (side) of the image sensor, while servo control information for initial position detection may be read by a dummy pixel region (second pixel region) on the other end (side) of the image sensor.

Also, in accordance with the present invention, the servo controller may perform the servo control according to speed ranges based on a plurality of servo control information for speed control in the speed ranges.

For example, when the speed of the carriage (rotation speed of the motor) is at a first speed (low speed), servo control for a first target speed range (a range that includes the first speed) is performed based on first servo control information for speed control. When the speed of the carriage is at a second speed (medium speed, high speed), servo control for a second target speed range (a range that includes the second speed) is performed based on second servo control information for speed control. In other words, when the speed of the carriage is at $1^{st}$-i-$^{th}$ (i is an integer of 2 or more) speeds, servo control for a target range of $1^{st}$-i-$^{th}$ speeds is performed based on $1^{st}$-i-$^{th}$ servo control information for speed control.

Also, the present invention relates to an electronic device comprising an image sensor having an effective pixel region and a dummy pixel region; at least one servo control sensor; a carriage on which the image sensor and at least one servo control sensor are mounted; a drive device to drive the carriage; an image sensor controller that controls the image sensor; and a servo controller that performs servo control of the drive device based on servo control information read by the servo control sensor(s).

By so doing, servo control can be performed by effectively using components associated with the image sensor (e.g., lens, light source, mirror, etc.), thereby realizing servo control with a fewer number of components.

In this case, the servo control sensor(s) are preferably disposed adjacent to the image sensor. Also, each servo control sensor is preferably disposed with its light receiving surface oriented in the same direction as that of the light receiving surface of the image sensor.

Also in accordance with the present invention, the servo control information may be contained in printed matter disposed in a detection area of the image sensor or the servo control sensor(s).

For example, when the electronic device includes a light-transmitting mounting base on which a read object is mounted, and a frame that supports the mounting base, the printed matter may be provided in detection areas on a rear or underside surface of a structure which includes a front or upper surface on which the read object is mounted. The printed matter may be provided on the frame or mounting base portion of that underside surface, or in an area on that surface extending across the boundary of the two structural components.

Furthermore, when the carriage includes a light source that generates light for irradiating the read object, the printed matter may be provided in an area irradiated by the light of the light source for reading by the image sensor. Alternatively, the printed matter may be provided in a detection area (area irradiated by the light source) of the servo control sensor(s), and such sensor(s) detect(s) servo control information on the printed matter using a light source for the image sensor.

The printed matter may be a rectangular and disposed along a scanning direction. When the sensor is a line sensor, the printed matter can be disposed along an auxiliary scanning direction of the line sensor.

Also in accordance with the present invention, the printed matter may be one or more barcodes, and the servo controller may perform the servo control based on bar intervals.

Also, the present invention relates to a method for controlling an electronic device. The method comprises controlling an image sensor having an effective pixel region and a dummy pixel region, and performing servo control on the image sensor based on servo control information read by at least a portion of the dummy pixel region of the image sensor.

Another electronic device controlling method involves controlling an image sensor, and performing servo control of a drive device that drives a carriage on which the image sensor is mounted, the servo control being performed based on servo control information read by one or more servo control sensors mounted on the carriage together with the image sensor.

BRIEF DESCRIPTION OF THE DRAWINGS

FIGS. 8(A) and (B) illustrate a method for reading printed matter using dummy pixel regions.

FIGS. 9(A) and (B) illustrate a method for reading printed matter using multiple optical sensors.

DESCRIPTION OF THE PREFERRED EMBODIMENTS

The embodiments described below in conjunction with the drawings are not intended as limiting, but rather are presented as exemplary arrangements of the present invention. As will be appreciated by those skilled in the art, not all structure/operation described in the present embodiments is necessarily indispensable in implementing a solution provided by the present invention.

Figure 1:
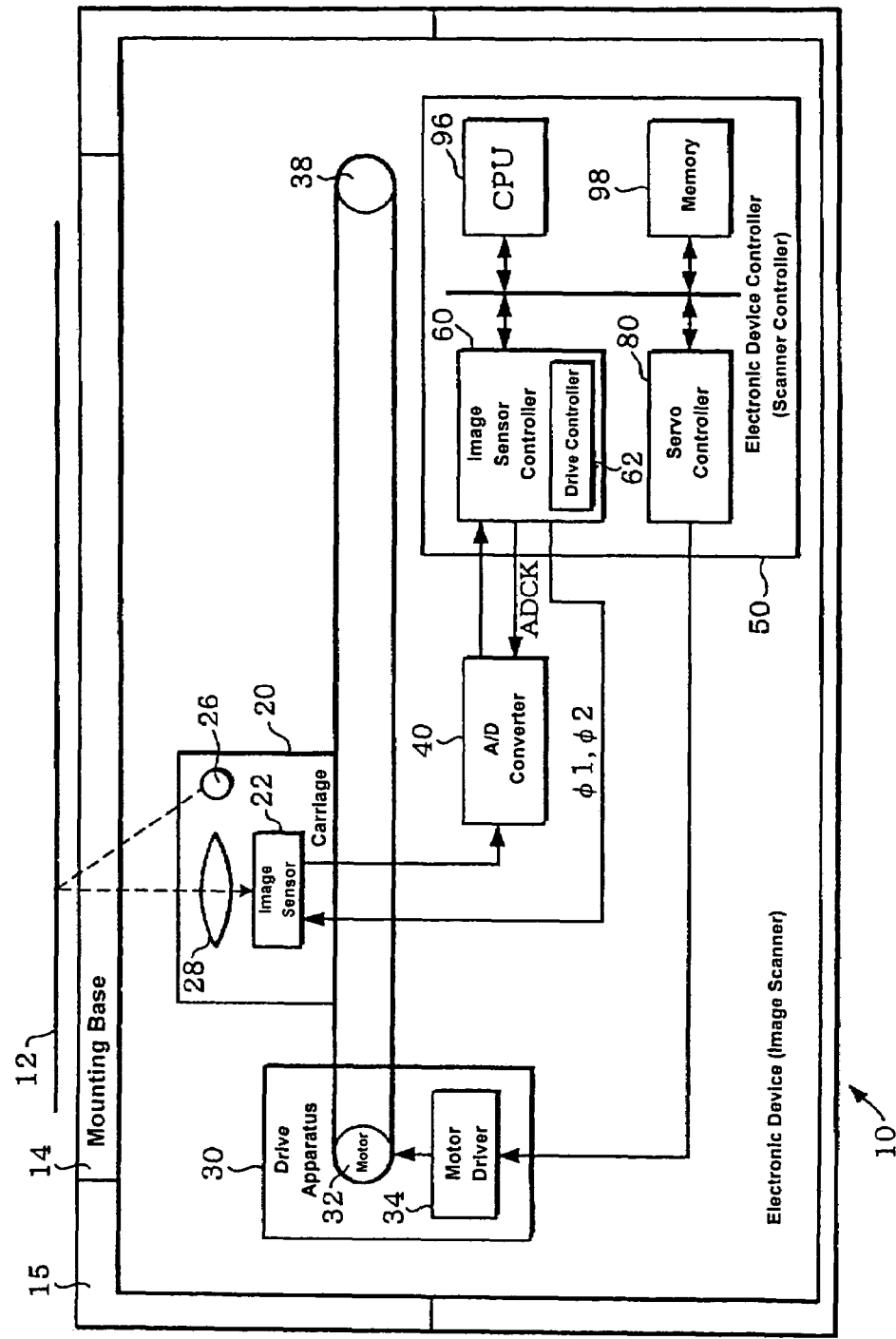
FIG. 1 is a block diagram illustrating an exemplary structure of an electronic device according to embodiments of the invention.

FIG. 1 shows an exemplary structure of an electronic device 10, which may be an image reading device, image scanner, or the like. As noted above, other configurations are possible, including configurations in which one or more of the illustrated components is omitted.

The electronic device 10 (e.g., a flat bed type image scanner) includes a frame 15 (e.g., a support member and housing) on which a generally rectangular mounting base 14 is carried for supporting a source object 12 (e.g., a printed document to be read). The mounting base 14 may be formed from a light-transmitting material—glass, for example. The source object 12 is mounted on an upper surface of the light-transmitting mounting base 14.

The electronic device 10 includes a carriage 20, on which is mounted an image sensor 22 (image pickup device, line sensor, one-dimensional sensor or color sensor). A CCD, CIS, or BBD may be used as the image sensor 22. Also mounted on the carriage 20 is a light source 26 that generates light for irradiating the source object 12, and an optical system or head such as a lens 28 that converges light emitted from the light source 26 and reflected off of the source object 12 on the image sensor 22. A mirror or the like is mounted on the carriage 20 to deflect the light from the light source 26 or the reflected light from the source object 12 in order to lengthen or bend the optical path. A light sensor for detecting servo control information may be provided independently of the image sensor 22 and mounted on the carriage 20. Also, an A/D converter 40 and an electronic device controller 50 may be mounted on the carriage 20 or mounted separately.

The electronic device 10 includes a drive device 30 that drives and shifts the carriage 20. The drive device 30 includes a motor 32, and a motor driver 34 that drives the motor 32. Motor 32 may be, for example, a DC motor of the brush or brushless variety.

In response to being driven by the motor 32, the carriage 20 moves in an auxiliary scanning direction, i.e., generally perpendicular to a main scanning direction. The image sensor 22 is disposed with its longitudinal direction being coincident with the main scanning direction. A driving belt 36, which is mounted on a pulley 38, is rotated by the motor 32, such that the carriage 20 affixed on the driving belt 36 moves in the auxiliary scanning direction. It will be appreciated that this is but one of a variety of methods by which the carriage 20 may be moved. Other arrangements are possible in accordance with modified embodiments. For example, the carriage 20 may be moved without using the driving belt 36 which may be accomplished, for example, using a linear motor mechanism.

Analog image data (an analog image signal) that is generated by the image sensor 22 is input into the A/D converter 40 which converts such data into digital image data (a digital image signal) and outputs the same to an electronic device controller 50 (e.g., a scanner controller).

The electronic device controller 50 is configured to control image read processing or the like performed by the electronic device 10. More specifically, controller 50 performs servo control for moving the carriage 20, or control for driving the image sensor 22 mounted on the carriage 20. The electronic device controller 50 includes an image sensor controller 60 that controls the image sensor 22, generating control signals and driving patterns and outputting the same to the image sensor 22. Also, the image sensor controller 60 receives digital image data from the A/D converter 40, and performs a variety of image processing operations, such as gamma conversion, shading processing, and binary conversion processing.

The image sensor controller 60 includes a drive controller 62 that generates transfer clocks $\phi 1$, $\phi 2$ (drive patterns, drive signals) and supplies them to the image sensor 22. The drive controller 62 supplies the image sensor 22 with transfer clocks $\phi 1$, $\phi 2$ having different clock frequencies according to regions of pixels (dummy pixels, non-reading pixels, reading pixels) of the image sensor 22. In other words, it supplies the transfer clocks $\phi 1$, $\phi 2$ such that clock frequencies, which are indicative of the rates of transferring image data, differ according to output periods of image data from the image sensor 22. More specifically, the drive controller 62 selects, from among a plurality of clock patterns, a clock pattern according to an output period of the image sensor 22 and supplies the transfer clocks $\phi 1$, $\phi 2$ based on the selected clock pattern.

The clock patterns are clock waveform patterns having different clock frequencies, rise and fall clock pulse timings, and/or duties of clocks, which are stored in a memory or the like. The drive controller 62 selects from among the clock patterns stored in the memory an appropriate clock pattern and repeats the selected clock pattern at predetermined cycles (for example, in cycles of pixel processing units) to thereby generate transfer clocks $\phi 1$, $\phi 2$.

Alternatively, transfer clocks $\phi 1$, $\phi 2$ having a constant frequency may be supplied without regard to output periods.

The electronic device controller 50 includes a servo controller 80 that performs servo control (feedback control) on the motor 32 that drives the carriage 20. More specifically, servo controller 80 controls movement of the carriage 20 to desired positions (such as an initial position) or at desired speeds based on servo control information obtained in association with movements of the carriage 20 (i.e., information regarding the detected positions and speeds of the carriage 20).

The electronic device controller 50 includes a CPU 96 (processor) and a memory 98 (ROM, RAM). The CPU 96 performs overall controls of the electronic device controller 50, and exchanges information with the outside. Also, the memory 98 stores programs and various data, and functions as a work region for the image sensor controller 60, the servo controller 80 and the CPU 96.

As previously noted, the electronic device controller 50 does not necessarily include all the components shown in FIG. 1; it may have a structure in which a part thereof is omitted. For example, the CPU 96 and the memory 98 may be omitted. Also, the functions of the electronic device controller 50, the image sensor controller 60 and the servo controller 80 may be realized by hardware circuits, or may be realized by both software and hardware circuits (e.g., one or more Application Specific Integrated Circuit (ASICs), or a general purpose processor.

Figure 2:
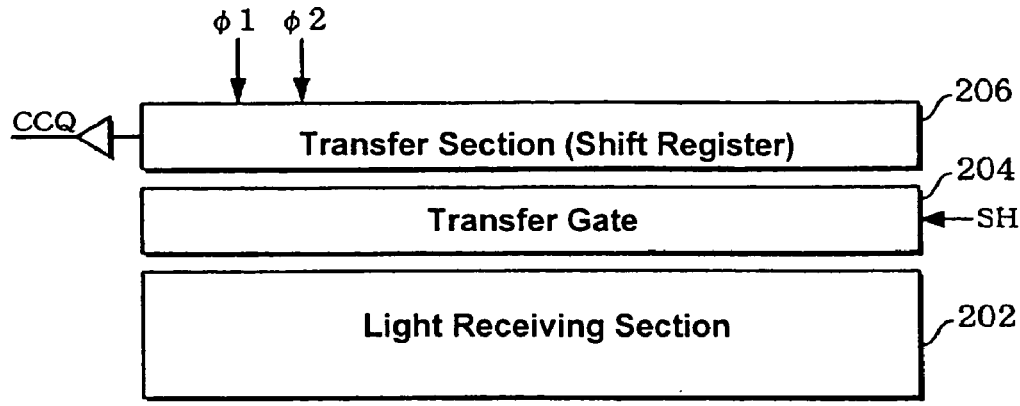
FIGS. 2(A)-(C) are diagrams illustrating an exemplary structure and operations of an image sensor according to embodiments of the invention.
Figure 2:
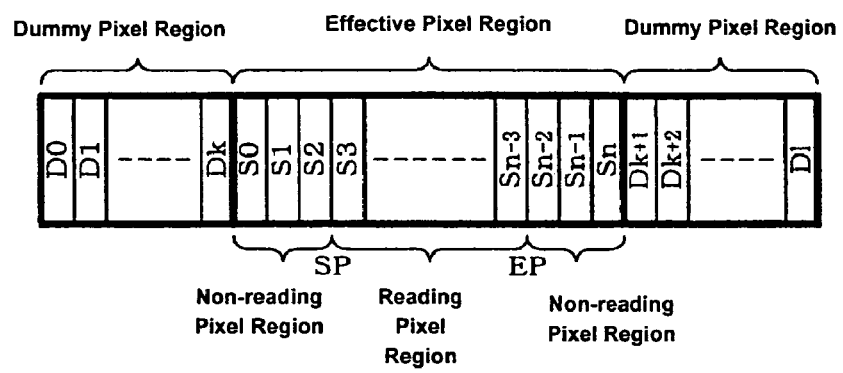
Figure 2:
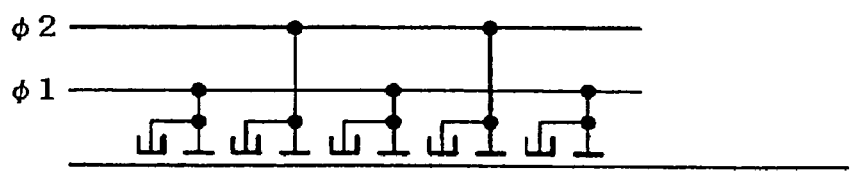

FIG. 2(A) shows an exemplary composition of the image sensor 22 (CCD line sensor). A light receiving section 202 includes a plurality of light receiving elements (photodiodes, pixels) that perform photoelectric conversion. As shown in FIG. 2(B), the light receiving section 202 is provided with an effective pixel region where effective pixels (light receiving elements) $S_0$-$S_n$ are disposed in a row, and dummy pixel regions where dummy pixels $D_0$-$D_k$ and $D_{k+1}$-$D_1$, which are not effective pixels, are disposed in a row. These dummy pixels are provided for no-load feeding or light-shield outputs.

Figure 3:
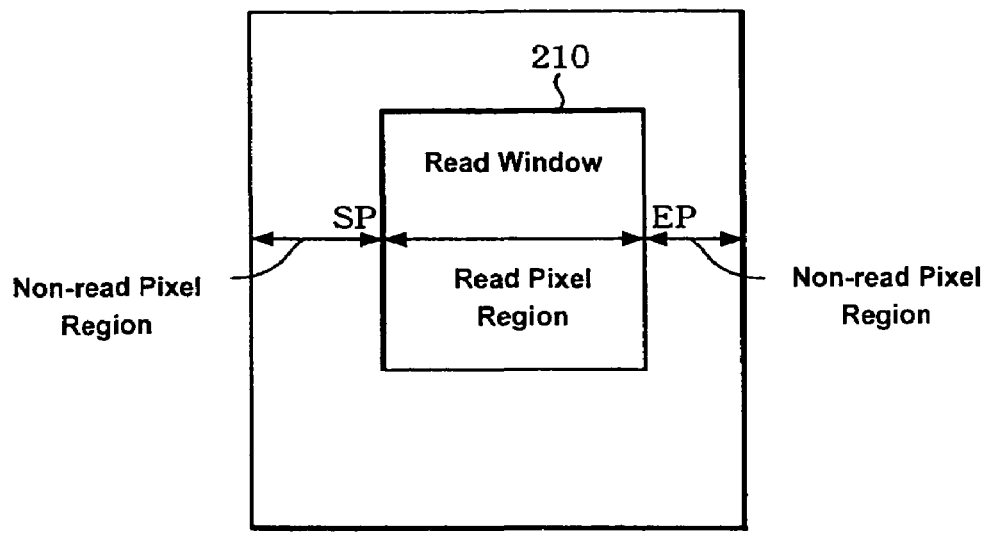
FIGS. 3(A) and (B) are diagrams illustrating an exemplary structure and operations of an image sensor according to embodiments of the invention.
Figure 3:
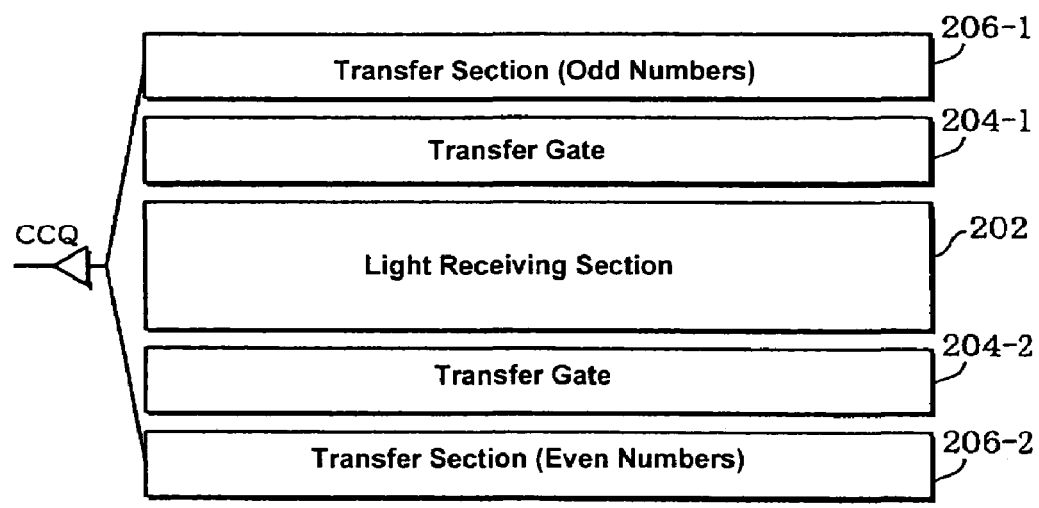

Also in the image scanner, a read window 210 for designating a reading range, such as the one indicated in FIG. 3(A), may be set by the user through an application program, such that image data only within this read window 210 is read. In this case, as shown in FIG. 3(A), a reading pixel region is defined as a region between a read starting position SP and a read ending position EP. Other regions (e.g., the one before SP and the one after EP) define non-reading pixel regions. Referring to FIG. 2(B), in an effective pixel region, the pixels $S_3$-$S_{n-3}$ between SP and EP define the reading pixel region, and the pixels $S_0$-$S_2$ and $S_{n-2}$-$S_n$ define respective non-reading pixel regions. It is noted that the positions of SP and EP that set the reading pixel region are not limited to those positions shown in FIG. 2(B). SP and EP may be set differently to provide a different reading pixel region. The reading and non-reading pixel regions may be collectively defined as the effective pixel region.

Each of the light receiving elements (e.g., pixels) of the light receiving section 202 generates and stores a charge according to the amount of light received. After a predetermined time period required for charge accumulation has passed, a shift signal SH becomes active, such that a transfer gate 204 turns on. In response, accumulated charge, which represents the analog image data, is transferred through the transfer gate 204 to a transfer section 206 which comprises a plurality of shift registers, one for each of the light receiving elements. Then, the image data (in the form of accumulated charge) is transferred between adjacent shift registers based on two phases of transfer clocks $\phi 1$, $\phi 2$, and serially outputted from a CCQ terminal of the image sensor 22. The frequency of the shift/transfer clocks may be variably controlled or may be set constant.

FIG. 2(C) shows an exemplary structure of a shift register of the transfer section 206 in connection with the transfer/shift clocks $\phi 1$, $\phi 2$.

The structure of the image sensor 22 is not limited to the one shown in FIG. 2(A). In another embodiment, shown in FIG. 3(B), a transfer gate 204-1 and a transfer section 206-1 for odd numbered pixels, and a transfer gate 204-2 and a transfer section 206-2 for even numbered pixels are provided. Also, in connection with either of the embodiments of the image sensor 22 (FIGS. 2(A) and 3(B)), a light receiving section, a transfer gate and a transfer section, for reading image data in each of R (red), G (green) and B (blue), are preferably provided.

Figure 4:
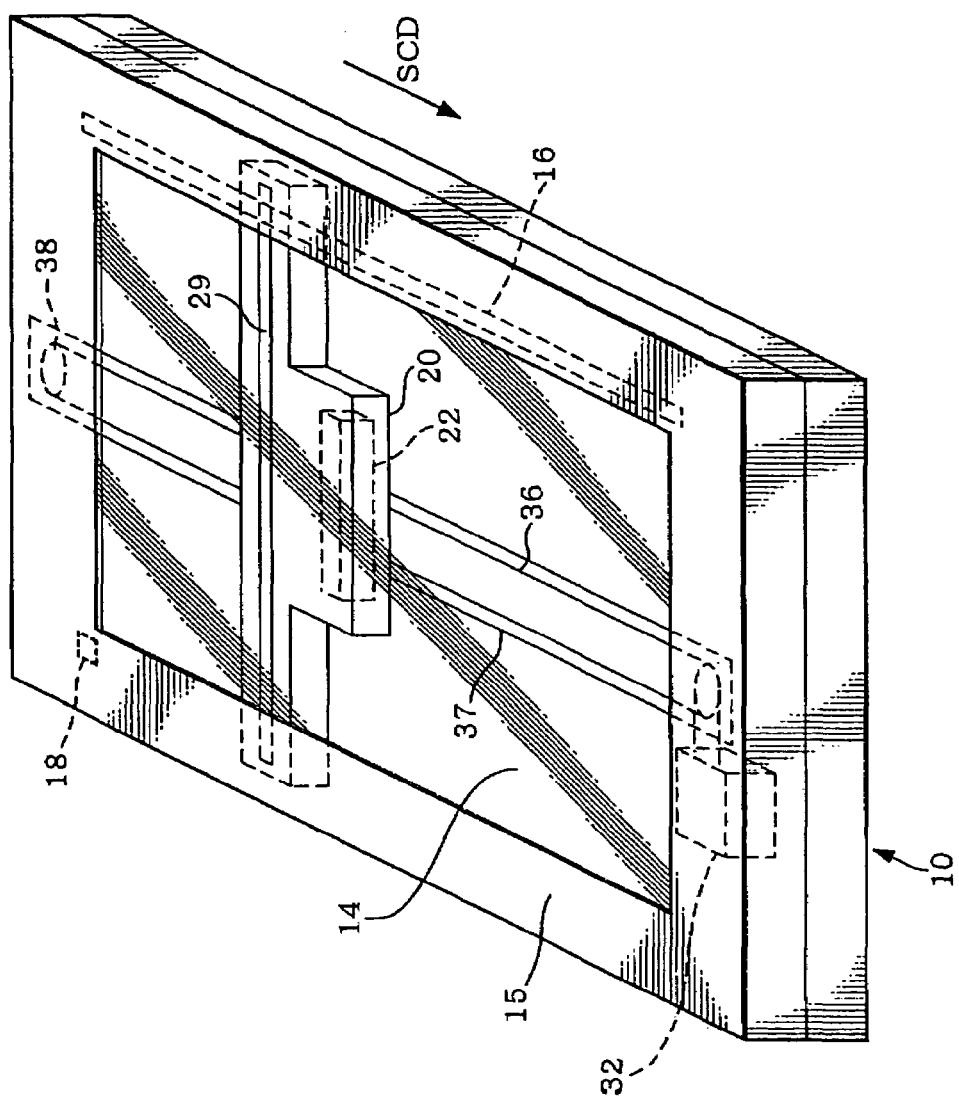
FIG. 4 is perspective view of an electronic device showing its various components according to embodiments of the invention.

Referring to FIG. 4, a schematic, perspective view of electronic device 10 in accordance with embodiments of the invention is illustrated. In the present embodiment, printed matter 16 and 18 for servo control are attached to, printed on, or otherwise disposed on, the electronic device 10. The printed matter 16, 18 may be composed of barcodes or the like and located on a rear or underside surface of either the mounting base 14 or the surrounding portion of the supporting frame 15. By way of reference, the front or upper surface of the mounting base 14 is where an object to be read is placed.

In one embodiment, the image sensor 22 mounted on the carriage 20 reads servo control information (printed information for controlling the speed and position of the carriage 20 or the like) contained in the printed matter 16 and 18, as well as text/images of the source object placed on the mounting base 14. More specifically, a detection area corresponding to an opening section 29 of the carriage 20 (which is an area above the opening section 29 that has generally the same shape as opening section 29) is irradiated by the light from the light source 26 (see FIG. 1) mounted on the carriage 20. Reflected light of the irradiated light (light reflected on the source object and printed matter) is converged by the lens 28 of the optical system (see FIG. 1), and the converged light is detected by the image sensor 22 to thereby read the servo control information in the printed matter 16 and 18 and the text/images on the reading object.

Then, based on the read servo control information, the servo controller 80 in FIG. 1 performs servo control on the motor 32 to thereby control the speed and position of the carriage 20. More specifically, the drive belt 36 is rotated by the motor 32, such that the carriage 20 is moved along a guide 37 in the auxiliary scanning direction. In so doing, the speed and position of the carriage 20 are controlled based on the servo control information provided in the printed matter 16 and 18, while the images/text on the source object are read.

In conventional electronic devices such as image scanners, facsimiles and copiers, a rotary encoder, a photo interrupter, and a separate position sensor to detect an initial position (home position) are provided to control movement of the carriage 20. This is disadvantageous in that such a construction requires more parts and more time to assemble the parts at factory.

In contrast, in accordance with embodiments of the invention, printed matter 16 and 18 containing servo control information are disposed on the electronic device 10, and the image sensor 22 that reads the text and images on the source object can also be used to read the servo control information. In fact, the entire optical system for the image sensor 22 (including the light source 26, lens 28 and the like in FIG. 1) can be used as an optical system that also reads the servo control information in the printed matter 16 and 18. Thus, with the present invention, the number of parts can be reduced, the work for mounting parts can be reduced, and the cost of electronic devices can be lowered.

Figure 5:
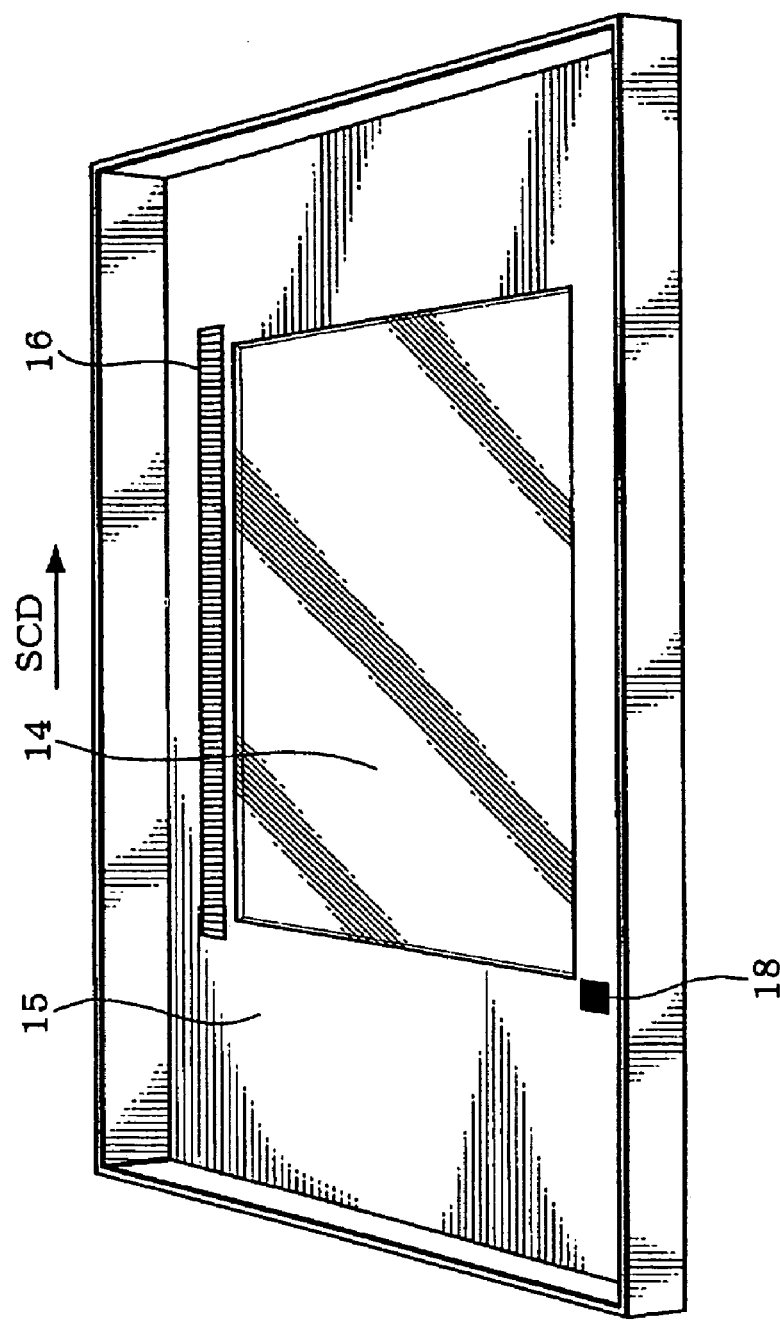
FIG. 5 illustrates positions where source objects (e.g., printed materials) are disposed.

Printed matter 16 and 18 are provided in detection areas (which are areas that can be detected by the image sensor; areas irradiated by the light source 26 in FIG. 1; or areas that oppose to the opening section 29 in FIG. 4) to be detected by the image sensor 22 that is mounted on the carriage 20. Note that FIG. 5 is a perspective view of the frame 15 (removed from the electronic device 10) as seen from the image sensor side. Thus, as indicated in FIG. 5, the printed matter 16 and 18 are disposed on an opposing surface (with respect to the surface on which the object to be read is mounted) of the frame 15 or corresponding surface of the mounting base 14.

Servo control information, which includes information for controlling the speed, position of the carriage 20 and the like, is contained in printed matter 16 and 18. More specifically, servo control information for controlling the speed of the carriage 20 may be contained in the printed matter 16. As the printed matter 16 for speed control, a barcode composed of bars of a predetermined color such as black or white arranged at predetermined intervals (intervals according to speeds) can be used. Also, the printed matter 16 is preferably rectangular and is disposed along the auxiliary scanning direction (e.g., SCD direction shown in FIGS. 4 and 5). Servo control information for detecting an initial position of the carriage 20 may be contained in the printed matter 18. As the printed matter 18 for initial position detection, printed matter that is painted in a predetermined color such as black or white (which can be considered as one type of barcode) can be used. Also, the printed matter 18 is preferably located in a location corresponding to the initial position (home position) of the carriage 20.

Figure 6:
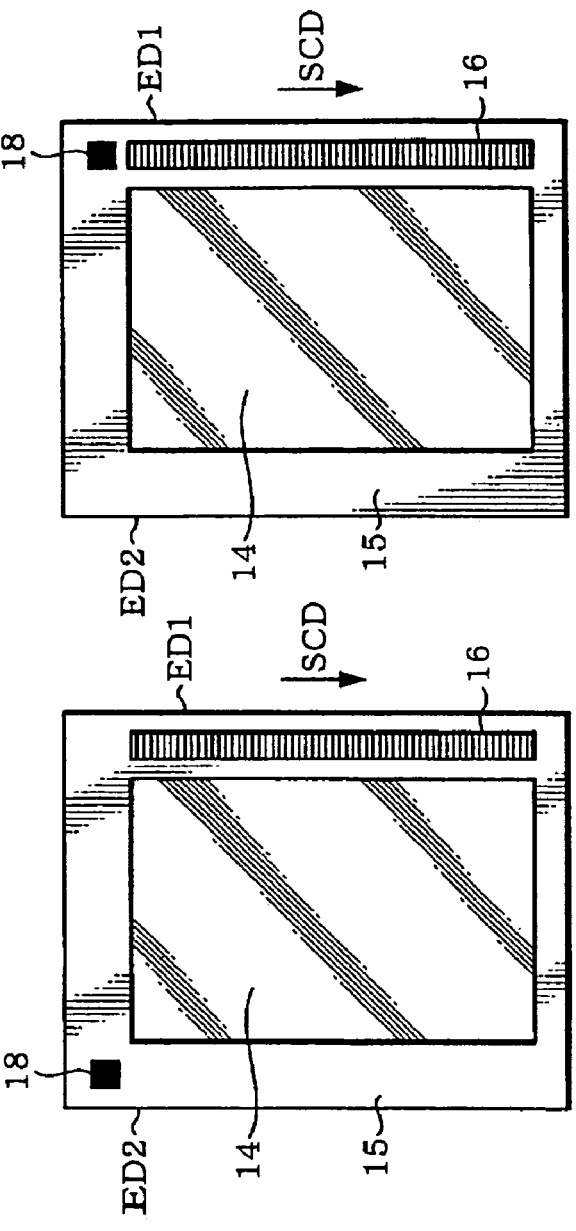
FIGS. 6(A)-(C) illustrates positions where certain printed information is disposed.
Figure 7:
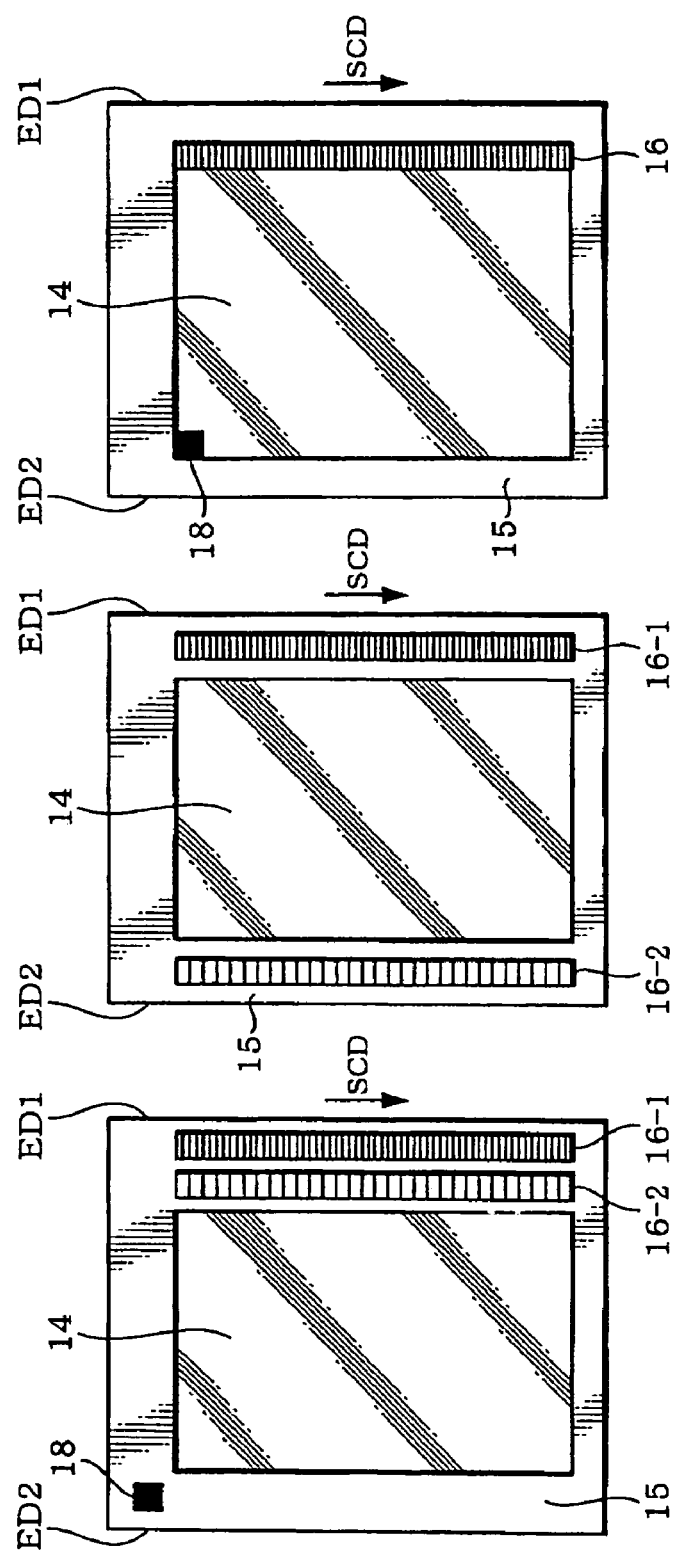
FIGS. 7(A)-(C) are further illustrations depicting where certain printed information is disposed.

As indicated in FIG. 6(A), the printed matter 16 for speed control may be provided on a first side ED1 (one side along the auxiliary scanning direction SCD) of the frame 15. The printed matter 18 for initial position detection may be provided on a second side ED2 (the other side along the auxiliary scanning direction SCD) of the frame 15. It is noted that FIGS. 6(A) and (B) and FIGS. 7(A)-(C) show the mounting base and surrounding portion of the frame 15 looking at its rear or underside surface (the opposite surface from where the object to be read is mounted).

By disposing the servo-control-containing printed matter 16 and 18 in this manner, the servo speed control information in the printed matter 16 can be read using a first dummy pixel region ($D_{k+1}$-$D_1$ in FIG. 2(B)) on the right side of the image sensor 22, and the servo control information for initial position detection in the printed matter 18 can be read using a second dummy pixel region ($D_0$-$D_k$ in FIG. 2(B)) on the left side of the image sensor 22. Accordingly, the servo control information for speed control and for initial position detection can be obtained by different dummy pixel regions, such that the processing by the servo controller 80 can be simplified.

As indicated in FIG. 6(B), the printed matter 16 and 18 may be disposed on the same side (ED1 or ED2).

As indicated in FIG. 6(C), a plurality of printed matters for speed control in different print patterns may be provided. This may be in the form of three print patterns: a print pattern 16-1 for low speed (first speed), a print pattern 16-2 for medium speed (second speed), and a print pattern 16-3 for high speed (third speed). In this case, print patterns 16-1, 16-2 and 16-3 (e.g., barcodes) have mutually different bar intervals (intervals between black or white bars). More specifically, print pattern 16-1 for low speed has the narrowest bar interval, print pattern 16-2 for medium speed has the second narrowest bar interval, and print pattern 16-3 for high speed has the greatest bar interval.

By providing servo control information in this way, the servo controller 80 can perform servo control according to the corresponding speed control ranges. For example, when the carriage 20 is at a low speed (first speed), the servo control is performed based on the servo control information in print pattern 16-1; when the carriage 20 is at a medium speed (second speed), the servo control is performed based on the servo control information in print pattern 16-2; and when the carriage 20 is at a high speed (third speed), the servo control is performed based on the servo control information in print pattern 16-3.

Alternatively, servo control information from two of the print patterns 16-1, 16-2 and 16-3 may be used to perform the servo control. For example, when the carriage is at a high speed, both the print pattern 16-3 for high speed and the print pattern 16-2 for medium speed may be used to perform the servo control.

Also, the number of separate printed matter provided for speed control may be 3, as indicated in FIG. 6(C), or may be 2, or 4 or more. The locations of the various speed control print matter may be varied as well. For example, as indicated in FIG. 7(A), print patterns 16-1 and 16-2 may be disposed on the ED1 side, and printed matter 18 for initial position detection may be provided on the ED2 side. The locations may be reversed of course. Also, three or more different speed control print patterns may be disposed on the same side (ED1 or ED2).

As indicated in FIG. 7(B), the print pattern 16-1 (e.g., the printed matter for a first speed) may be provided on the ED1 side, and the print pattern 16-2 (e.g., the printed matter for a second speed) may be provided on the ED2 side. Other arrangements are also possible as will be appreciated. For example, two or more different print patterns may be provided on either the ED1 or the ED2 side.

As indicated in FIG. 7(C), the print patterns 16-1-16-3 and printed matter 18 may be disposed on the rear surface of the mounting base 14 instead of the frame 15. More specifically, the printed matter 16 and 18 may be attached to opposite sides of the rectangular mounting base 14 along ED1 and ED2 sides respectively. This narrows the reading area for an object to be read and therefore may not be feasible in all cases. However, detection by the image sensor 22 (sensor) can be facilitated.

While a variety of positional arrangements for disposing servo-control-containing printed matter 16, 18 on the rear or underside surface of the structure that includes the mounting base 14 and the surrounding portion of the frame 15 have been illustrated, other positional arrangements are possible, as will be appreciated by those skilled in the art. Such printed matter can be disposed in other areas (on the above-described rear surface or elsewhere) that are detectable by the sensor(s) designated to read the servo control information contained therein.

The printed matter 16 (16-1-16-3) and 18 may be in the form of stickers that may be adhered to the rear side of the frame 15 or the mounting base 14. Alternatively, the printed matter may be directly printed on the frame 15 or the mounting base 14 by an ink jet method or the like. Or, members (for example, metal members) printed with appropriate control patterns may be attached to the frame 15 or the mounting base 14.

Servo control information in the various printed matter 16, 18 can be read using a dummy pixel region (contain one or preferably a plurality of pixels) of the image sensor. For example, FIG. 8(A) schematically shows a perspective view of the carriage 20, which is removed from the electronic device 10 and viewed from the side where there is an opening section 29 in the carriage 20. The image sensor 22 is mounted on a substrate (e.g., a circuit substrate) 25. The electronic device controller 50 shown in FIG. 1 may also be mounted on the substrate 25.

The image sensor 22 is provided with an opening section 23 (a window provided in the IC of the image sensor 22). Reflected light from the read object 12 and the printed matter enters the opening section 29, its light path is deflected by an optical system (lens, mirror or prism) of the carriage 20, and the reflected light is converged and projected into the opening section 23 of the image sensor 22. The image sensor 22 detects the reflected light that enters through the opening section 23 to read images/text from the read object and servo control information on the printed matter.

As indicated in FIG. 8(B), the servo control information in printed matter 16, 18 can be read using the dummy pixel regions (dummy pixel regions without light shields) of the image sensor 22. In one embodiment, the servo control information on the printed matter 16 is read by a dummy pixel region ($D_{k+1}$-$D_1$ in FIG. 2(B)) on one side (e.g., the right side) of the light receiving section 202 of the image sensor 22, while the servo control information in printed matter 18 is read by a dummy pixel region ($D_0$-$D_k$ in FIG. 2(B)) on the other side (e.g., the left side) of the image sensor 22. In this case, the printed matter 16, 18 are provided in detection areas (areas irradiated by light from the light source 26 in FIG. 1) of the image sensor 22, such that the servo control information can be securely read. As a result, the dummy pixel regions, which are not necessary for reading effective image data, can be effectively used to read servo control information.

One or more dummy pixels (light receiving element(s)) in a dummy pixel region may be used to read servo control information on a particular printed matter. When a plurality of dummy pixels are so used they are preferably arranged in the main scanning direction, and a majority processing, an average processing or similar operation is performed to determine the read servo control information.

In the embodiment of FIGS. 8(A) and (B), the servo control information in printed matter 16, 18 are read by dummy pixel regions on each side of the image sensor 22. However, such information can be read by only one of these dummy pixel regions. Also, some of the pixels in the effective pixel region of the image sensor 22 can be used to read servo control information in the printed matter 16, 18.

Also, when printed matter are provided for speed and position control as described with respect to FIGS. 6(A) through 7(C), a portion of the dummy pixel region may be designated as a servo control pixel region. Then, the clock frequencies of $\phi1$, $\phi2$ may be variably controlled during a servo control information output period during which image data read by the servo control pixel region is outputted from the transfer section. In that case, the clock frequencies of $\phi1$, $\phi2$ during a servo control information output period are made slower than the clock frequencies of $\phi1$, $\phi2$ during dummy pixel output periods in which no servo control information is output. Even more specifically, the clock frequencies of $\phi1$, $\phi2$ during a servo control information output period are made slower than the clock frequencies of $\phi1$, $\phi2$ during other dummy pixel output periods but faster than the clock frequencies of $\phi1$, $\phi2$ during a reading pixel output period. As a result, servo control information can be appropriately read using a designated section of pixels in the dummy pixel region.

In another embodiment, illustrated in FIGS. 9(A) and (B), optical sensors 24-1 and 24-2, which are provided independently of the image sensor 22, are used to detect servo control information on printed matter. The optical sensors 24-1, 24-2 are mounted on the carriage 20 together with the image sensor 22, and the optical sensors 24-1 and 24-2 read the servo control information on the printed matter 16 and 18.

For example, reflected light from the to-be-read object and the printed matter enters opening section 29 shown in FIG.

9(A), its light path is deflected by an optical system of the carriage 20, and the reflected light is converged and enters opening section 23 of the image sensor 22 and the optical sensors 24-1, 24-2. The optical sensors 24-1, 24-2 read servo control information on the printed matter by detecting the reflected light entered.

As indicated in FIG. 9(B), the servo control information on the printed matter 16, 18 can be read using the optical sensors 24-1, 24-2 disposed on respective sides of the image sensor 22. In the illustrated arrangement, the optical sensor 24-1 is provided on the right side of the image sensor 22, and that optical sensor detects one type of servo control information (e.g., speed control information) on printed matter 16. The optical sensor 24-2 is provided on the left side of the image sensor 22, and that optical sensor detects the other type of servo control information (e.g., initial position detection information) on printed matter 18. In this way, the servo control information on the printed matter 16, 18 can be securely read. It is noted that the detection areas of the optical sensors 24-1, 24-2 are located on a rear or underside surface of the frame/mounting base structure which is also the side on which the optical sensors 24-1, 24-2 are located. The detection areas extend from an outer periphery region of the mounting base 14 across the boundary to an inner periphery region of the frame 15.

When the optical sensors 24-1, 24-2 are provided independently of the image sensor 22 as indicate in FIGS. 9(A) and (B), the number of parts of the sensors may increase compared with the embodiment shown in FIGS. 8(A) and (B). However, even with separately provided servo-control-information-reading sensors, the other optical system (e.g., the light source 26, lens 28, mirror or prism, etc.) for the image sensor 22 can also be used for the optical sensors 24-1, 24-2. Further, a rotary encoder and a photo interrupter, which are necessary for conventional electronic devices, are unnecessary in the embodiment of FIGS. 9(A) and (B). Also, by mounting the optical sensors 24-1, 24-2 on the carriage 20 together with the image sensor 22, a more compact arrangement can be realized, as compared with an arrangement in which sensors are dispersed in many places in the electronic device. Accordingly, with both the embodiment of FIGS. 8(A) and (B) and the embodiment of Figs. (A) and (B), as compared with corresponding conventional electronic devices, the number of parts can be reduced, the work for assembling these parts can be reduced, and the cost of such devices can be reduced.

As will be appreciated by those skilled in the art, alternate arrangements to that shown in FIGS. 9(A) and (B) are certainly possible. For example, the optical sensors may both be provided on the same side of image sensor 22. Also, three or more optical sensors may be provided.

Figure 10:
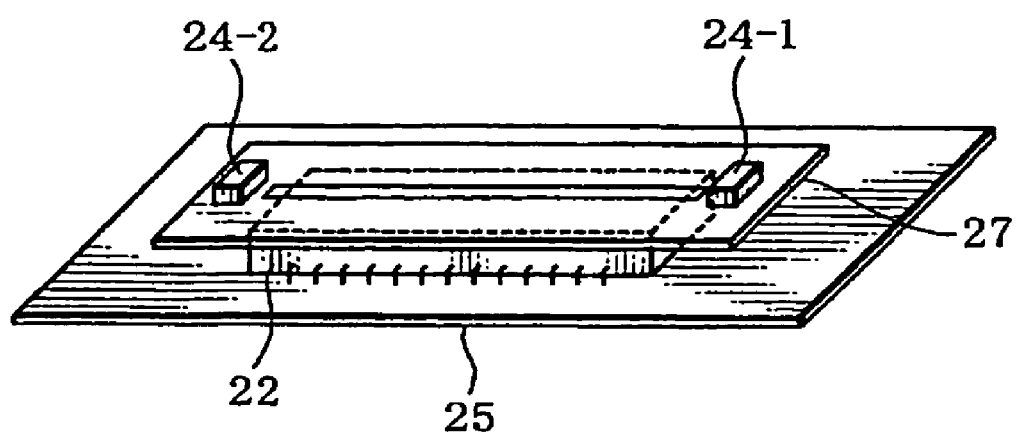
FIG. 10 illustrates a method for reading printed matter using the optical sensors.

Further, although FIG. 9(B) shows that the optical sensors 24-1, 24-2 are attached to the substrate 25, such sensors may be attached to a substrate 27 that is used for light shielding or the like, as indicated in FIG. 10. The substrate 27 provided in parallel with the substrate 25 is affixed to an upper part of the image sensor 22, and includes an opening section for passing light.

Also, each of the optical sensors 24-1, 24-2 may have one or more light receiving elements.

Figure 11:
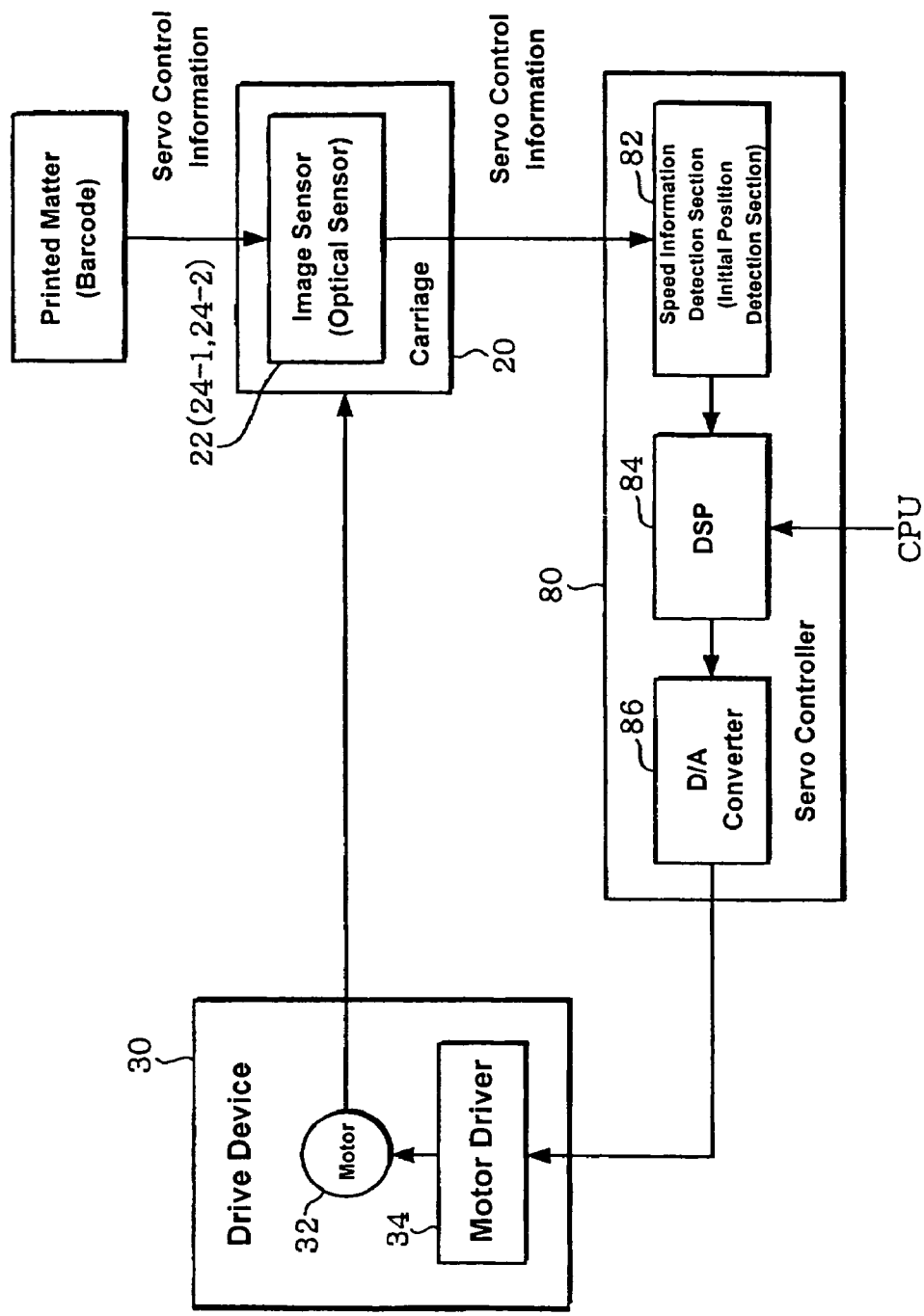
FIG. 11 is a block diagram illustrating an exemplary structure of a servo controller.

FIG. 11 shows an exemplary structure of the servo controller 80. It is noted that the servo controller 80 is not limited to the structure shown in FIG. 11; one or more of the components thereof may be omitted or other components may be added. In the illustrated embodiment, the servo controller 80 includes a speed information/initial position detection section 82. The speed information detection section 82 detects servo control speed information about the carriage 20 read by the image sensor 22 (or the optical sensors 24-1, 24-2). More specifically, a processing such as binary-conversion of the servo control information provided from the image sensor 22 may be performed to thereby detect speed information. Detection section 82 may also function as an initial position information detection section.

The function(s) of the speed information/initial position detection section 82 may be realized using a Digital Signal Processor (DSP) 84 in a succeeding stage that performs a variety of processing operations for servo control based on the speed/initial position information on the carriage 20, which is detected by the detection section 82. In other words, feedback control of the speed of the carriage 20 (motor 32) is performed to match the speed of the carriage 20 at a particular time with one of the target speeds set in a speed table (speed profile) that may be written by the CPU. More specifically, when the movement of the carriage 20 is started, acceleration control for the carriage 20 is performed such that the speed of the carriage 20 is controlled to match a target speed set for an acceleration period in the speed table. Next, speed control for the carriage 20 is performed according to a target speed set for a constant speed period in the speed table to move the carriage 20 at that constant speed. Then, when the carriage 20 approaches a target position, a deceleration control for the carriage 20 is performed such that the speed of the carriage 20 is decelerated to a target speed set for a deceleration period in the speed table. In this manner, the carriage 20 can be moved to, and stopped at, a desired position.

When the carriage 20 reaches a read starting position, the servo controller 80 asserts or activates a read permission signal to be outputted to the image sensor controller 60. As the carriage 20 moves by an amount equivalent to the number of read lines, the read permission signal is deactivated.

The DSP 84 may also perform a control to return the carriage 20 to the initial (home) position based on the initial position information detected by the initial position detection section 82. More specifically, when the carriage 20 has moved, and a predetermined color (e.g., black) of the printed matter 18 is detected by the image sensor 22 (or optical sensor 24-2), the carriage 20 is stopped. Taking into account the inertia of the carriage 20, the printed matter 18 may preferably be disposed at a location before the initial (home) position where the carriage 20 is actually stopped.

A D/A converter 86 converts digital drive signals from the DSP 84 to analog drive signals, and outputs the same to the motor driver 34. Then, the motor driver 34 drives the motor 32 to thereby perform speed control and position control of the carriage 20.

Figure 12:
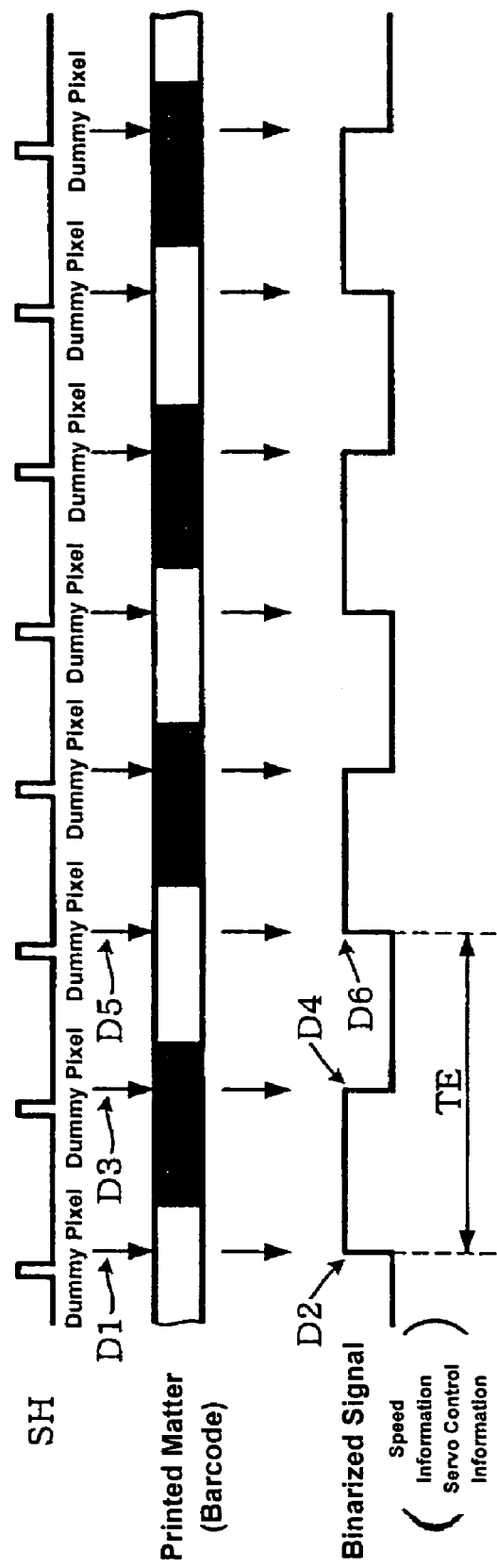
FIG. 12 is a diagram including timing waveforms illustrating an operation of reading printed matter.

FIG. 12 shows an example of timing waveforms for operations of the servo controller 80. For example, at D1 of FIG. 12, the color of the printed matter (bar code) is detected as white, based on image data read by dummy pixels (e.g., dummy pixels $D_0$-$D_k$ in FIG. 2(B)) immediately after the shift signal SH becomes active. More specifically, the data from the image sensor 22 is binarized, such that a binarized signal representing speed information, for example, becomes high (active) as indicated by D2. Then, at D3 the color of the printed matter is detected as black, based on data read by the dummy pixels, and the binarized signal becomes low (non-active) as indicated by D4. Also, at D5 the color of the printed matter is detected as white based on data read by the dummy pixels, and the binarized signal becomes high as indicated by D6. By obtaining the time interval TE between edges (rising edges or falling edges) of the binarized signal, the speed information for the carriage 20 can be detected.

An output CCQ (analog image data) of the image sensor 22 is binarized by a binarizing section 44, which can be included in the A/D converter 40 as shown in FIG. 13(A), to generate the binarized signal indicated in FIG. 12. For example, as indicated in FIG. 13(B) at E1 (D2 in FIG. 12), when the voltage level of CCQ is higher than a predetermined threshold value (in the case of white), the binarized signal is determined to be "1," and as indicated in FIG. 13(B) at E2 (D4 in FIG. 12), and when the CCQ voltage is lower than the predetermined threshold value (in the case of black), it is determined to be "0." In this manner, the binarized signal is generated. Then, the generated binarized signal is output to the servo controller 80 (speed information detection section).

The binarizing section 67 may alternatively be included in the image sensor controller 60, as indicated in FIG. 13(C). In that arrangement, digital image data ADQ from the A/D converter 40 is binarized by the binarizing section 67 through digital signal processing. In this case, the binarizing section 67 may detect speed information and initial position information based on binarized data.

Figure 14:
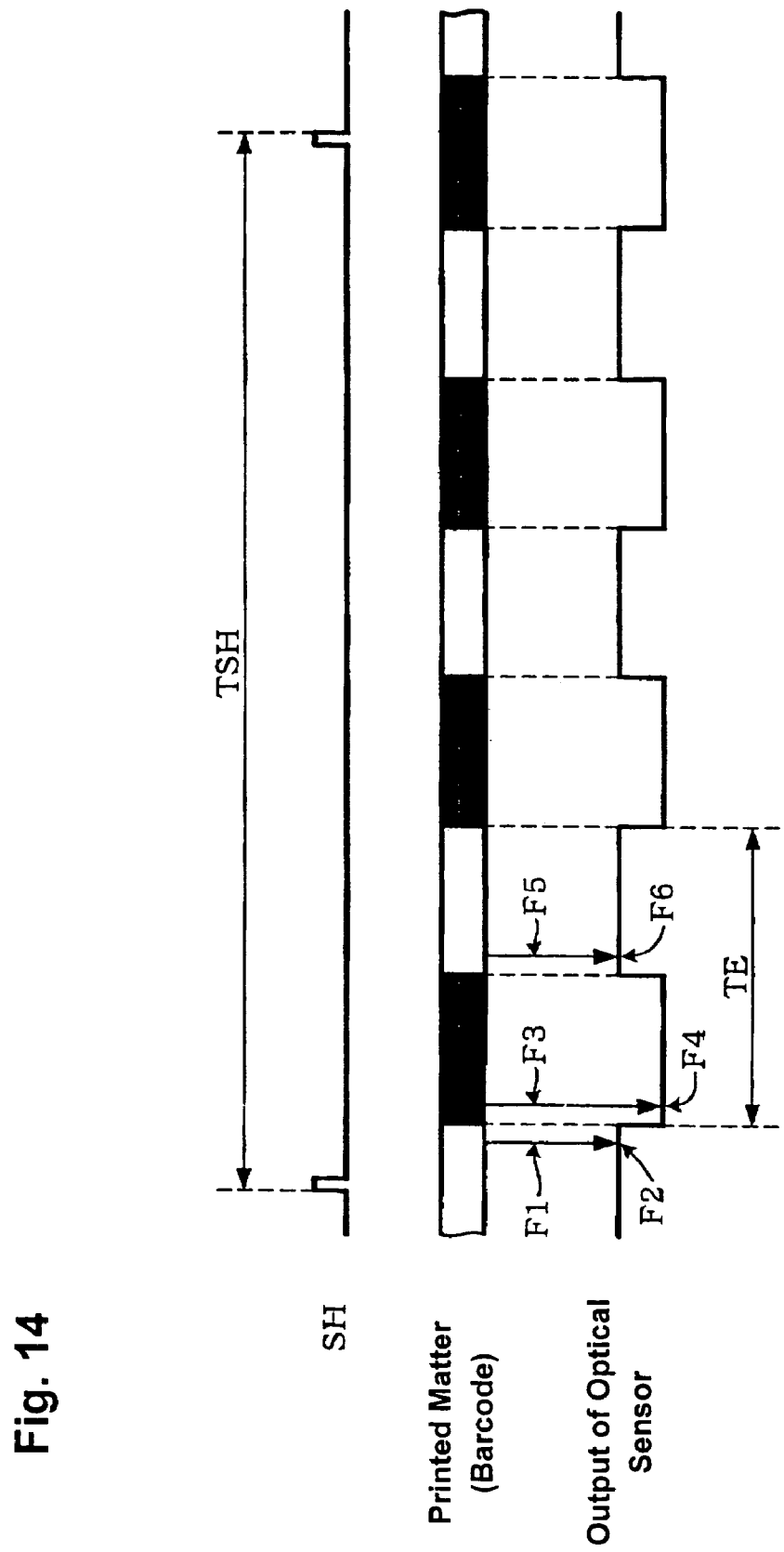
FIG. 14 is a diagram including the timing of various waveforms illustrating an operation of reading printed matter.

FIG. 14 shows an example of timing waveforms applicable to the reading of servo control information on printed matter by the optical sensors 24-1 and 24-2 that are provided independently of the image sensor 22 as indicated in FIGS. 9(A) and (B). For example, at F1 of FIG. 14, the color of the printed matter (barcode) is detected as white by the optical sensor (24-1, 24-2). As a result, the output of the optical sensor becomes high (active) as indicated by F2. At F3, the color of the printed matter is detected as black by the optical sensor. As a result, the output of the optical sensor becomes low (non-active) as indicated by F4. At F5, the color of the printed matter is detected as white by the optical sensor. As a result, the output of the optical sensor becomes high as indicated by F6. By obtaining the time interval TE between edges (rising edges or falling edges) of the output (binarized signal) from the optical sensor, the speed information for the carriage 20 can be detected. By using the detected speed information (initial position information), a servo control like the one described with reference to FIG. 11 can be realized.

In the example shown in FIG. 14, the amount of servo control information obtained in the time interval TSH between pulses of the shift signal SH is greater compared with the example shown in FIG. 12. In other words, the number of edges (rising or falling edges) of the output (binarized signal) of the optical sensor during the time interval TSH is increased. Accordingly, it gives an advantage that a higher precision in controlling movements of the carriage 20 can be achieved. It is noted that, even when printed matter is read using an image sensor as in the case of FIG. 12, an image sensor (CCD) with a high sensitivity may be used to achieve a higher precision in controlling movement of the carriage 20.

Figure 15:
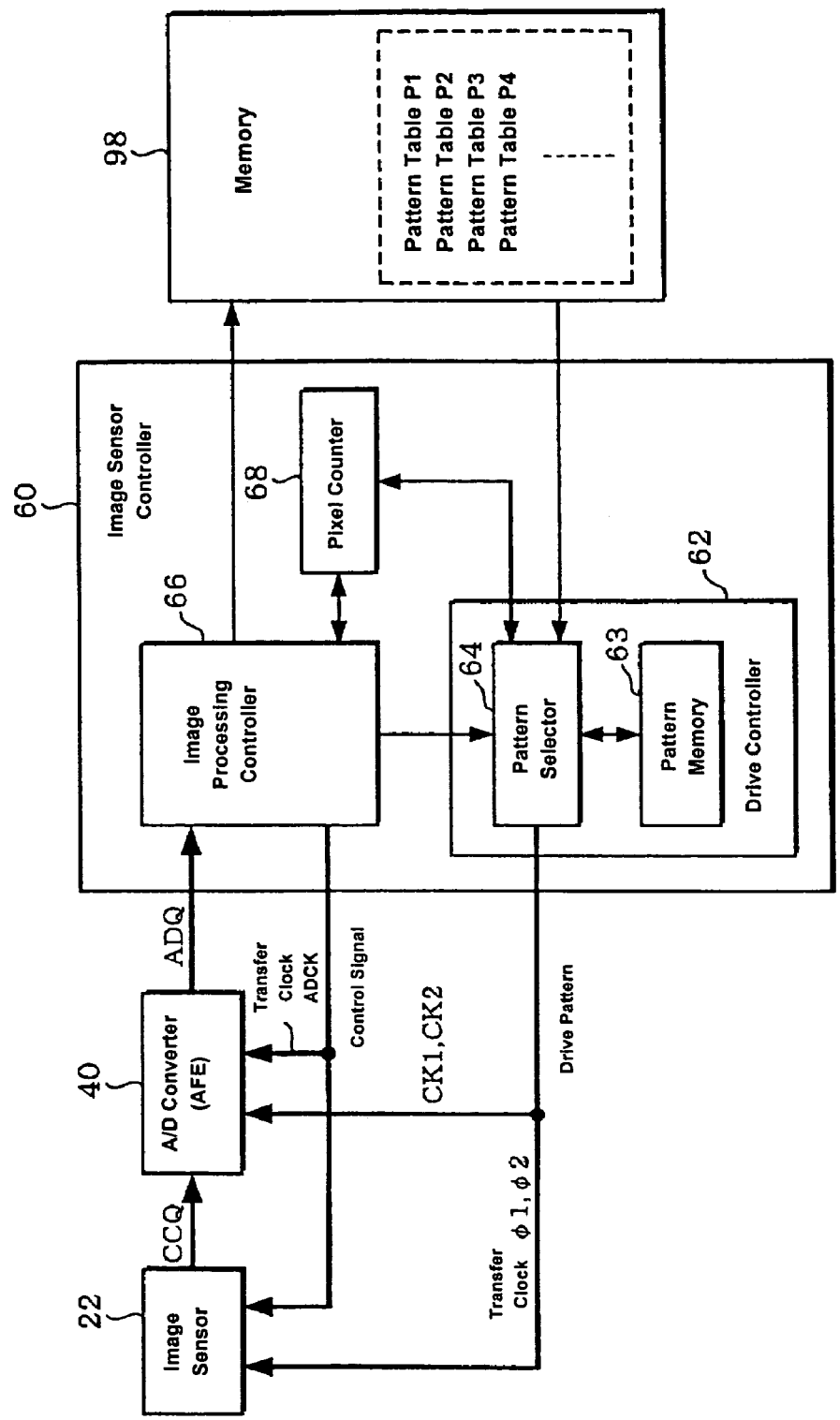
FIG. 15 is a block diagram illustrating an exemplary structure of an image sensor controller.

FIG. 15 shows an exemplary structure of the image sensor controller 60. It is noted that the image sensor controller 60 need not necessarily include all the components shown in FIG. 15; a part thereof may be omitted.

Figure 16:
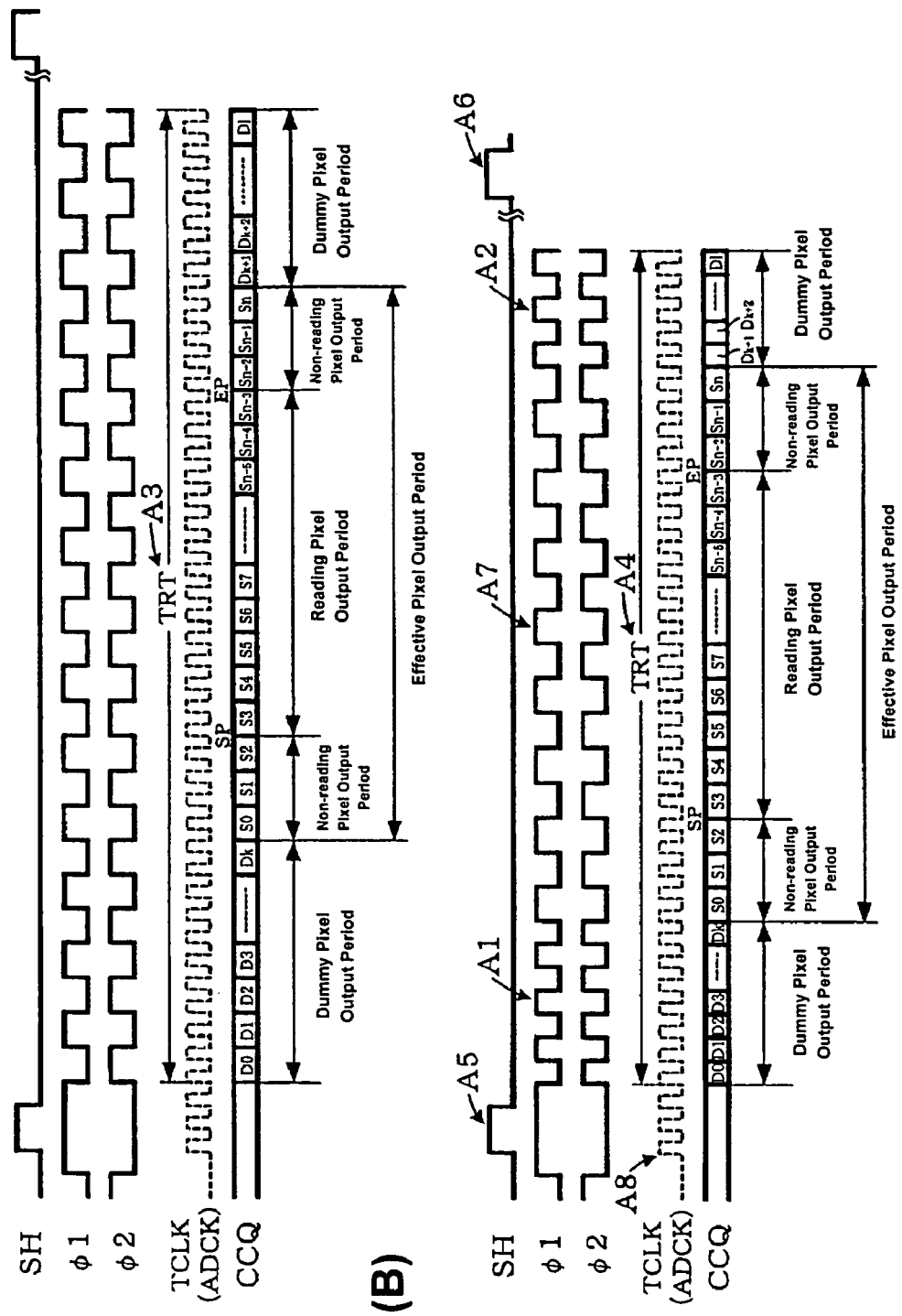
FIGS. 16(A) and (B) is a timing diagram illustrating an embodiment of the invention by comparison.

In accordance embodiments of the invention, the clock frequencies of shift/transfer clocks $\phi1$, $\phi2$ are made different (patterns of $\phi1$, $\phi2$ are made different) according to output periods during which image data are outputted from the transfer section 206 of image sensor 22. For example, FIG. 16(A) shows an example of waveforms in which the frequencies of the clocks $\phi1$, $\phi2$ do not change (remain constant) during the output periods. In contrast, in accordance with other embodiments of the invention, as indicated by A1, A2 in FIG. 16(B), the clock frequencies of the clocks $\phi1$, $\phi2$ are increased in dummy pixel output periods.

The dummy pixel output period is a period during which image data for pixels (light receiving elements) in the dummy pixel regions ($D_0$-$D_k$, $D_{k+1}$-$D_1$ in FIG. 2(B)) are outputted from the transfer section 206. A non-reading pixel output period is a period during which image data for pixels in the non-reading pixel region ($S_0$-$S_2$, $S_{n-2}$-$S_n$) are outputted from the transfer section 206. A read pixel output region is a period during which image data for pixels in the reading pixel region ($S_3$-$S_{n-3}$) are outputted from the transfer section 206. The non-reading pixel output periods and the read pixel output region combined define an effective pixel output period. The clock frequencies of $\phi1$, $\phi2$ are faster in the dummy pixel output periods, as indicated by A1 and A2 of FIG. 4(B), than the clock frequency in the effective pixel output period indicated by A7 in the figure.

The shift signal SH turns on the transfer gate 204 in FIG. 2(A). TCLK is a clock for counting the number of pixels. The A/D converter 40 shown in FIG. 1 outputs to the image sensor controller 60 digitally converted image data with a clock ADCK (A/D conversion/transfer clock) that is synchronized with TCLK Also, CCQ is an output of the transfer section 206 of image sensor 22.

As indicated in FIG. 16(B), when the clock frequencies of $\phi1$, $\phi2$ are increased during the dummy pixel output periods, it can be seen by comparing A3 in FIG. 16(A) and A4 in FIG. 16(B) that the transfer time TRT, which is a time for the transfer section 206 to complete transferring image data for one line (3 lines for RGB), is decreased. Accordingly, as indicated by A5, A6 in FIG. 16(B), the time interval of pulses of shift signal SH can be shortened, such that the image reading speed can be increased. There is no problem in increasing the clock frequency during the dummy pixel output periods because image data for dummy pixels are unnecessary. Furthermore, since image data for effective pixels is transferred with a normal clock frequency as indicated by A7 in FIG. 16(B), no inconvenience would occur in image data obtained. Accordingly, a faster image reading speed can be achieved while proper image data is read.

The frequencies of shift/transfer clocks $\phi1$, $\phi2$ in non-reading pixel output periods may be made faster than the clock frequencies in reading pixel output periods. Also, the clock frequencies of clocks $\phi1$, $\phi2$ may be changed in stages according to output periods (dummy pixel output period, non-reading pixel output period, reading pixel output period). For example, the frequencies of shift/transfer clocks $\phi1$, $\phi2$, can be made highest in the dummy pixel output period, second highest in the non-reading pixel output period, and lowest during the reading pixel output period. The dummy pixel output period may be further divided into stages during which the clock frequencies are increased as the output progresses toward the non-reading pixel output period. Also, when RGB image data is read, the number of clocks $\phi1$, $\phi2$ and/or the number of shift signals SH may be increased.

Also, for example, when printed matter for servo control (for speed and position control) are provided as indicated in FIGS. 6(A) through 7(C), a servo control region may preferably be provided in the dummy pixel region. Then, the clock frequencies of $\phi1$, $\phi2$ may be variably controlled during a servo control information output period during which image data read by the servo control region is outputted from the transfer section. In this case, the clock frequencies of $\phi1$, $\phi2$ during a servo control information output period are made slower than the clock frequencies of $\phi1$, $\phi2$ during other dummy pixel output periods but faster than the clock frequencies of $\phi1$, $\phi2$ during a reading pixel output period (or effective pixel output period). As a result, servo control information can be appropriately read with a servo control region provided in the dummy pixel region.

As indicated in FIG. 15, the image sensor controller 60 includes a drive controller 62 that supplies drive patterns (drive signals) to the image sensor 22 and A/D converter 40. The drive patterns may include the transfer clocks φ1, φ2 and the shift signal SH, which are described above. Also, signals CK1, CK2 that determine sampling timings for analog image data (image signals) at the A/D converter 40 can be included.

The drive controller 62 includes a pattern selector 64 that selects a particular pattern table (clock pattern) from among a plurality of pattern tables (clock patterns) according to the type of output period of image sensor 22 to set the drive pattern of φ1, φ2 for that output period. A pattern memory 63 temporarily stores the pattern tables (clock patterns) from which the pattern selector 64 selects. More specifically, pattern tables that are to be used at the time of actual driving operations are read out from the memory 98, and written in the pattern memory 63. For example, when pattern tables P1, P2 and P3 are to be used in the dummy, non-reading and reading pixel output periods, respectively, these pattern tables P1, P2 and P3 are transferred to and stored in the pattern memory 63. In one arrangement, P1 is set between the first and second addresses of the pattern memory 63, P2 is set between the second and third addresses, and P3 is set between the third and fourth addresses. The pattern selector 64 selects from among these pattern tables (clock patterns) P1, P2 and P3 the pattern table that is designated for the given output period, and generates the drive pattern based on the selection.

The A/D converter 40 receives analog image data CCQ from the transfer section 206 of image sensor 22 and converts the same into digital image data ADQ. An image processing controller 66 supplies a transfer clock ADCK (A/D conversion/transfer clock) to the A/D converter 40, and receives digital image data ADQ from the A/D converter 40 based on ADCK. Then, image processing operations such as a gamma conversion, shading processing or binary-conversion processing are rendered on the digital image data.

A pixel counter 68 counts the number of pixels. More specifically, it starts counting when SH becomes active, i.e., at a timing indicated by A8 in FIG. 4(B). Then, each time TCLK becomes active (high), the number of pixels is incremented. The drive controller 62 and the image processing controller 66 perform processing based on the counted value of the number of pixels provided from the pixel counter 68. For example, the drive controller 62 judges based on the counted value of the number of pixels if the current output period is a dummy pixel output period, a non-reading pixel output period, or a reading pixel output period, and selects and reads out a pattern table from the pattern memory 63 according to the determined output period. By so doing, a pattern table (clock pattern) designated for a particular output period of the image sensor can be selected from a plurality of pattern tables.

Figure 17:
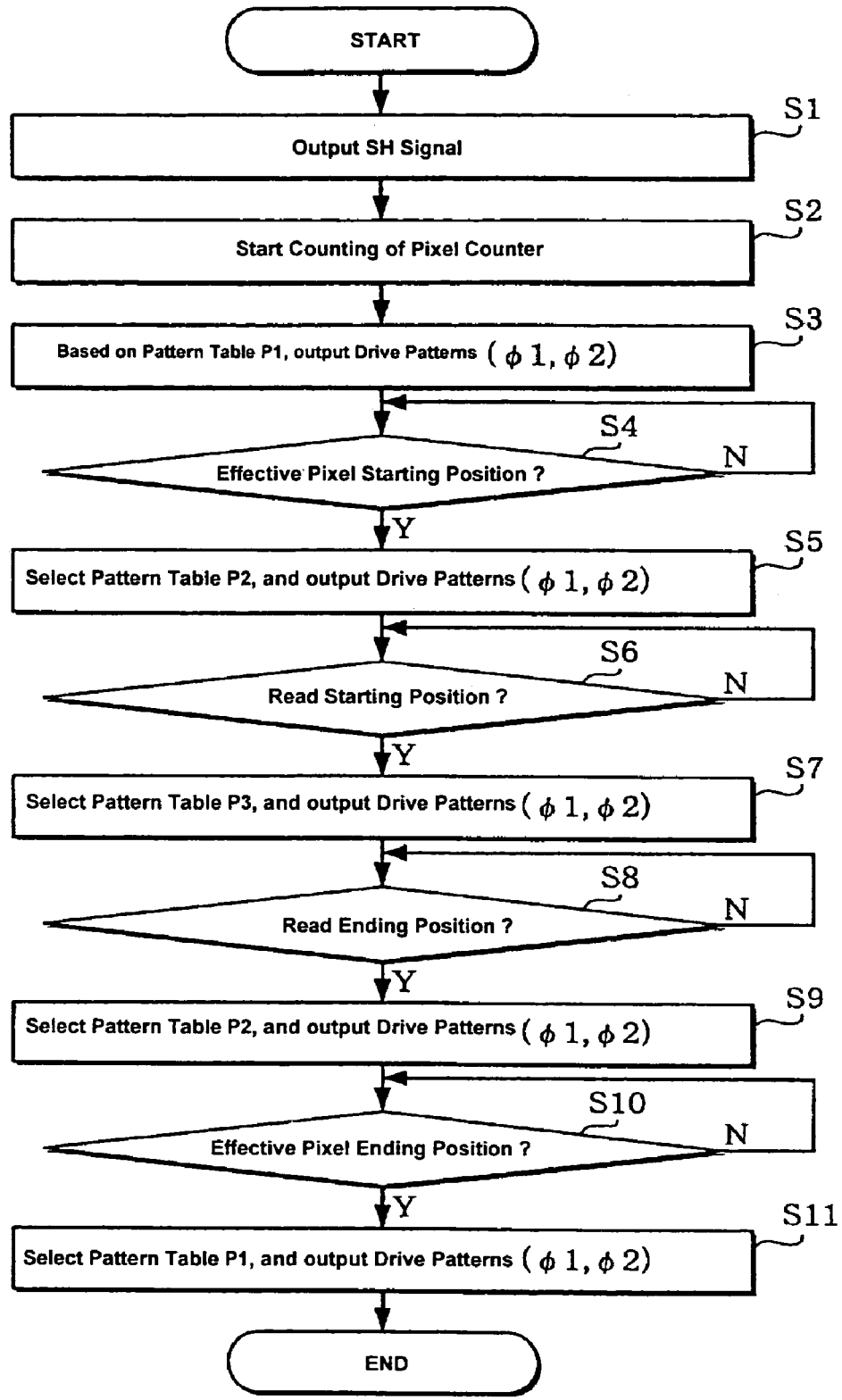
FIG. 17 is a flow chart illustrating operations of an image sensor controller according to embodiments of the invention.

Next, operations of the image sensor controller 60, in accordance with embodiments of the invention, are described using a flow chart in FIG. 17. First, a shift signal SH is outputted (step S1). Then, the counting operation of the pixel counter 68 is started (step S2). Next, based on selected pattern table P1, drive patterns (for clocks φ1, φ2) are outputted (step S3). More specifically, the pattern selector 64 reads the pattern table P1 from the pattern memory 63, and repeats the patterns of P1 in cycles of pixel (RGB) processing units, to generate drive patterns.

Figure 18:
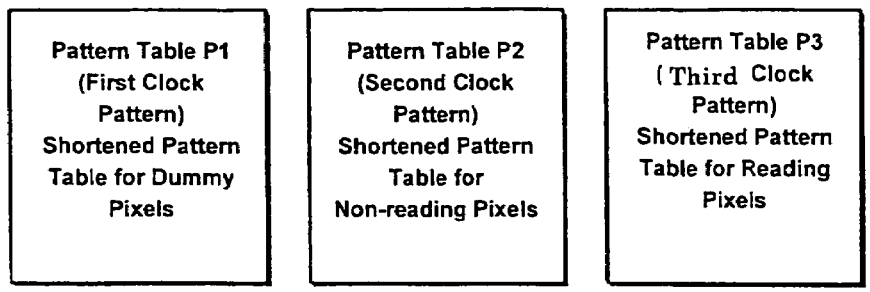
FIGS. 18(A)-(D) show pattern tables and their use in conjunction with other features according to embodiments of the invention.
Figure 18:
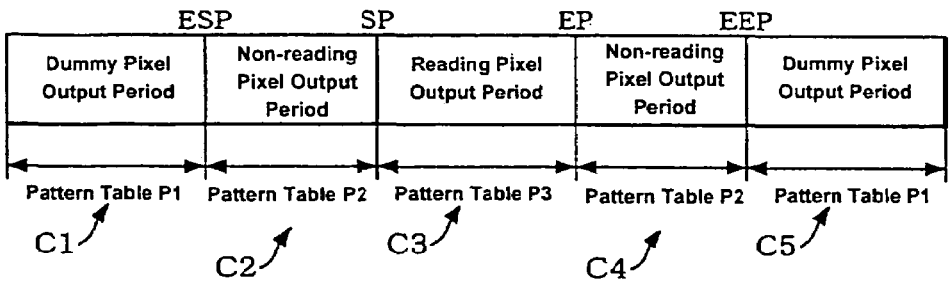
Figure 18:
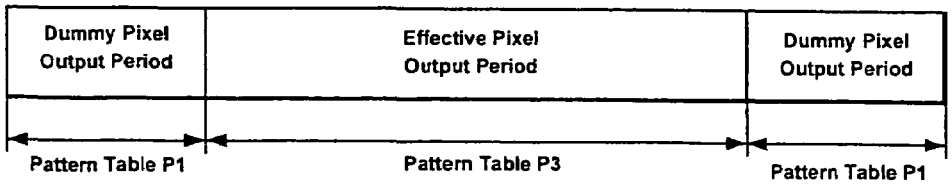

For example, as indicated in FIG. 18(A), in accordance with one embodiment, a shortened pattern table P1 (first clock pattern) for dummy pixels, a shortened pattern table P2 (second clock pattern) for non-reading pixels, and a shortened pattern table P3 (third clock pattern) for reading pixels are stored in the pattern memory 63. The pattern tables P1, P2 and P3 define waveforms of drive patterns of shift/transfer clocks φ1, φ2, as indicated in FIG. 18(B). More specifically, they describe how φ1 and φ2 are to be changed each time an ADR (an address of internal state that is synchronized with a reference clock of the image sensor controller 60) is incremented. Thus, in step S3, the shortened pattern table P1 for dummy pixels is selected among the pattern tables P1, P2 and P3 shown in FIG. 18(A).

Returning to FIG. 7, next a determination is made as to whether the output has reached an effective pixel starting position ESP (step S4). When it has, a shortened pattern table P2 (second clock pattern) for non-reading pixels is selected, and drive patterns (φ1, φ2) are outputted (step S5). In this way, as indicated by C1, C2 in FIG. 18(C), the pattern table P1 (first clock pattern) is selected in a dummy pixel output period, and the pattern table P2 (second clock pattern) is selected in the non-reading pixel output period.

Next, a determination is made as to whether the output has reached a read starting position SP (step S6). When it has, a shortened pattern table P3 (third clock pattern) for reading pixels is selected, and corresponding drive patterns (φ1, φ2) are outputted (step S7). Thus, the pattern table P3 (third clock pattern) is selected in the reading pixel output period, as indicated by C3 in FIG. 18(C).

Next, a determination is made as to whether the output has reached a read ending position EP (step S8). When it has, a shortened pattern table P2 (second clock pattern) for non-reading pixels is selected, and corresponding drive patterns (φ1, φ2) are outputted (step S9). Thus, the pattern table P2 (second clock pattern) is selected in the non-reading pixel output period that follows the reading pixel output period, as indicated by C4 in FIG. 18(C).

Next, a determination is made as to whether the output has reached an effective pixel ending position EEP (step S10). When it has, a shortened pattern table P1 (first clock pattern) for dummy pixels is selected, and corresponding drive patterns (φ1, φ2) are outputted (step S11). Thus, the pattern table P1 (first clock pattern) is selected in the dummy pixel output period that follows the non-reading pixel output period, as indicated by C5 in FIG. 18(C).

It is noted that, when the same clock frequency is used for the non-reading pixel output period and the reading pixel output period (in the case of FIG. 16(B)), steps S5, S6, S8 and S9 in FIG. 17 are not necessary. In such an embodiment, the pattern tables P1 and P3 (first and third clock patterns) are selected as indicated in FIG. 18(D).

In accordance with these embodiments, drive patterns (shift/transfer clocks φ1, φ2) are supplied to the image sensor 22 based on pattern tables (clock patterns) selected from the pattern memory 63, and pattern switch timing setting information. In the embodiment of FIG. 17, that information includes effective pixel starting position ESP, read starting portion SP, read ending position EP, and effective pixel ending position EEP.

A variety of drive patterns can be generated simply by software manipulation, without adding modifications to the hardware circuit. For example, by simply rewriting contents of the pattern tables stored in the memory 98 (pattern memory 63) and appropriately adjusting the control aspect of the software, the clock frequencies of the shift/transfer clocks φ1, φ2 to be supplied in each output period can be changed. In other words, a variety of shift/transfer clock patterns can be created and programmed for selected use.

Also, the read starting position SP and the read ending position EP (pattern switch timing setting information) can be changed using software, so that user changes to the read window 210 indicated in FIG. 3(A) can be accommodated. In other words, even when the read window 210 is changed to different ranges, the clock frequencies of shift/transfer clocks φ1, φ2 in non-reading pixel output periods can always be set to higher values by simply changing the settings of SP and EP.

Furthermore, by changing the settings of the effective pixel starting position ESP, and the effective pixel ending position EEP, a variety of different kinds of image sensors having different arrangements of dummy pixel regions and effective pixel regions can be readily accommodated. In other words, when an image sensor having a broad dummy pixel region or an image sensor having a narrow dummy pixel region is used, the clock frequencies of shift/transfer clocks φ1, φ2 in dummy pixel output periods can always be set to higher values by only changing the settings of ESP and EEP.

In the embodiment in which a servo control region is provided within a dummy pixel region, and the frequencies of φ1, φ2 in servo control information output periods are variably controlled, an additional pattern table (fourth clock pattern) for servo control regions is preferably used to set those frequencies. The pattern table for servo control regions makes the frequencies of φ1, φ2 slower than does the pattern table for other dummy pixel regions but faster than does the pattern table for reading pixel regions. Bo so doing, the reading speed is made faster, and the servo control information can be appropriately picked up.

In accordance with the embodiments described with reference to FIGS. 8(A) and (B), the printed matter 16, 18 containing servo control information are provided in detection areas of the dummy pixel regions of the image sensor 22. Then, the image sensor controller 60 controls the image sensor 22 to read the servo control information. More specifically, the image sensor controller 60 supplies drive patterns (transfer clocks) to the image sensor 22, and makes the image sensor 22 output the servo control information it reads. Then the servo controller 80 servo-controls the drive device 30 (motor 32) to control movements (speed and initial position control) of the carriage 20.

Figure 19:
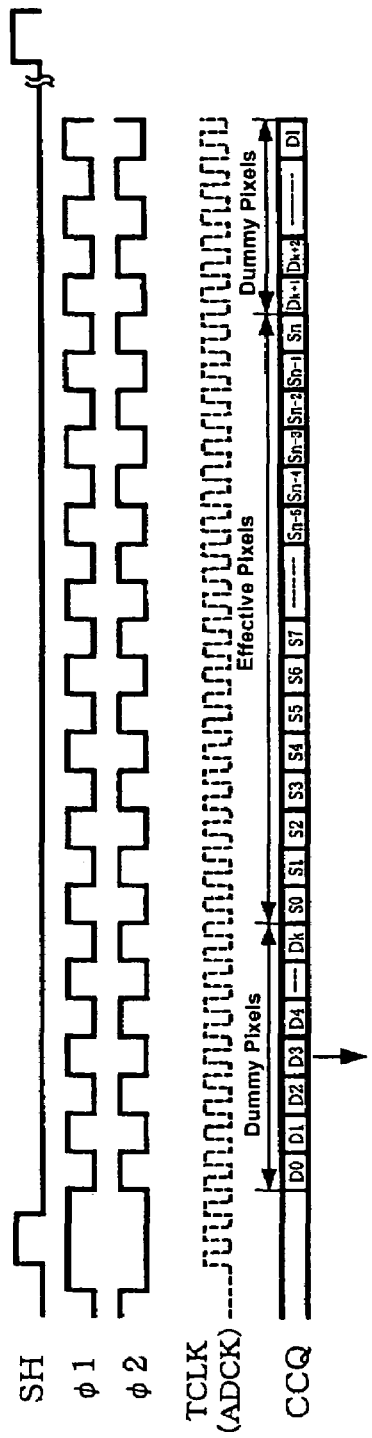
FIGS. 19(A) and (B) are timing diagrams illustrating a method for reading servo control information using dummy pixel regions according to an embodiment of the invention.
Figure 19:
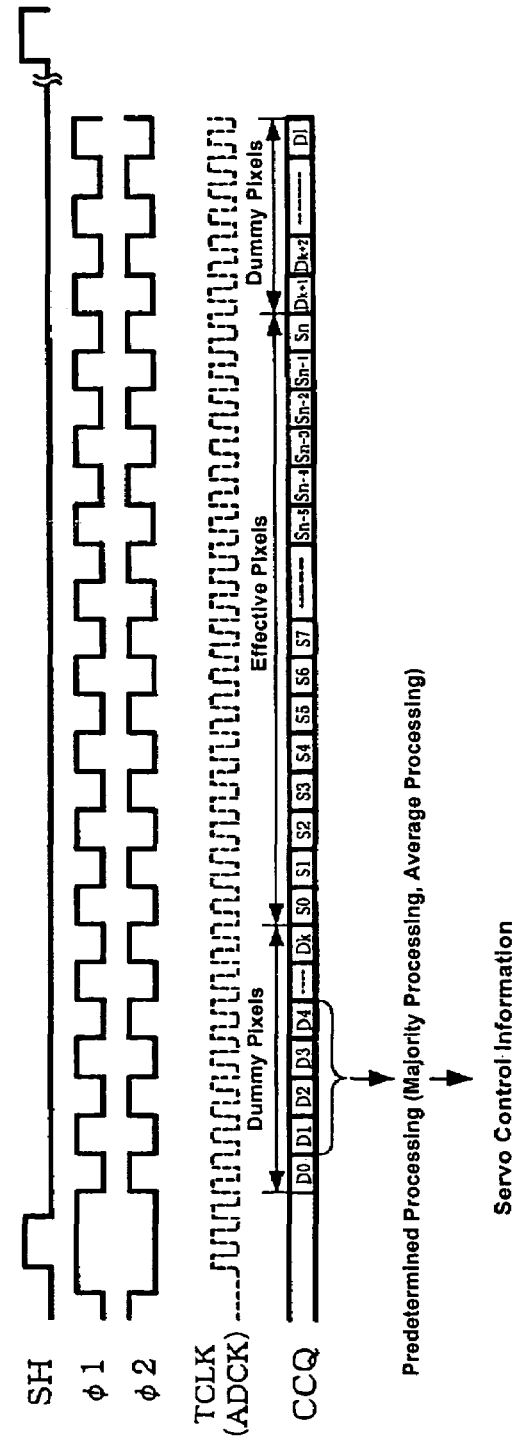

Then, as indicated in FIG. 19(A), in accordance with embodiments of the invention, the servo control is performed based on image data obtained by light receiving elements (pixels) of one or more dummy pixel regions. Preferably, two such regions, a first pixel region on one end side of the image sensor and the second pixel region on the other end side of the image sensor, are used. In this case, image data for servo control information is read by one light receiving element (pixel, photodiode), or by a plurality thereof as indicated in FIGS. 19(A) and (B). Some or all of the pixels in the dummy pixel region may be used to read servo control information. The range(s) of such pixels used for reading servo control information may be determined based on the width of printed matter (and margins) or the like.

Also, as shown in FIG. 19(B), predetermined processing is preferably rendered on data obtained by a plurality of light receiving elements to obtain servo control information for servo-controlling the carriage 20 (drive device). The predetermined processing may include a majority processing, an average processing or the like.

In majority processing, servo control information is specified by the majority of the image data obtained by the plurality of light receiving elements in that group. More specifically, when the servo control information obtained by the light receiving contain more data indicative of white (D1 in FIG. 12), a determination is made that the resultant servo control information obtained is for example "1" (D2 in FIG. 12). On the other hand, if there is more data indicative of black (D3 in FIG. 12), a determination is made that the resultant servo control information obtained is for example "0" (D4 in FIG. 12).

In average processing, servo control information is specified by averaging data obtained by the plurality of light receiving elements. More specifically, an average value of the data is obtained, and a determination is made that the resultant servo control information obtained is for example "1" if the average value is indicative of white. On the other hand, a determination is made that the resultant servo control information obtained is for example "0" if the average is indicative of black.

Figure 13:
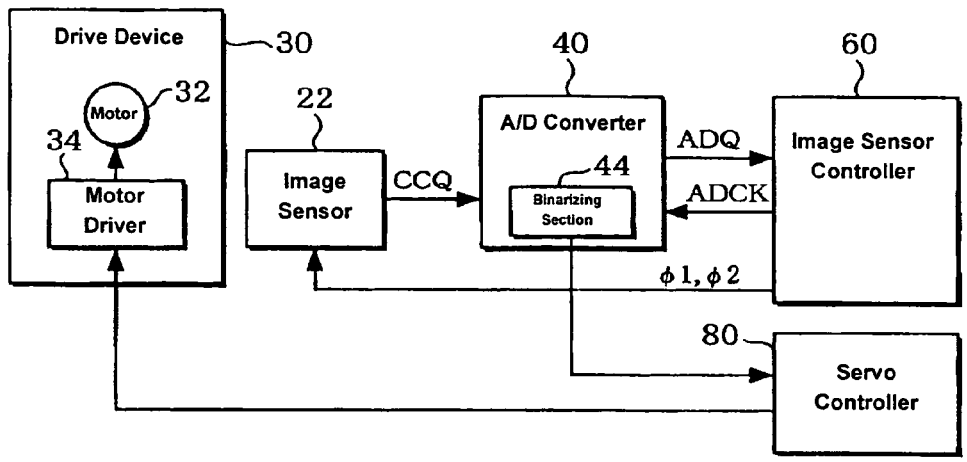
FIGS. 13(A)-(C) are diagrams illustrating binarization processing.
Figure 13:
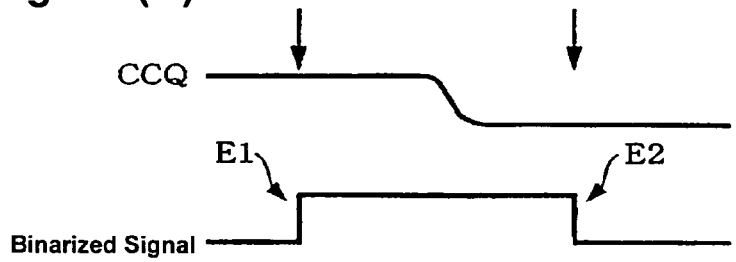
Figure 13:
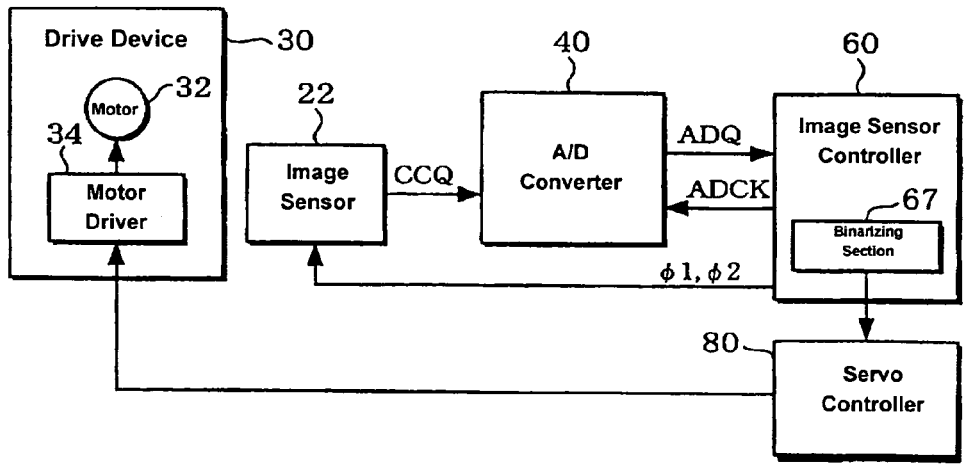

It is noted that the majority processing or the average processing may be rendered on data that has undergone binarization processing (see FIGS. 12-13(C)), or may be rendered on data before such processing. Also, other processing, other than majority or average processing, may be rendered on data obtained by the plurality of light receiving elements.

Figure 20:
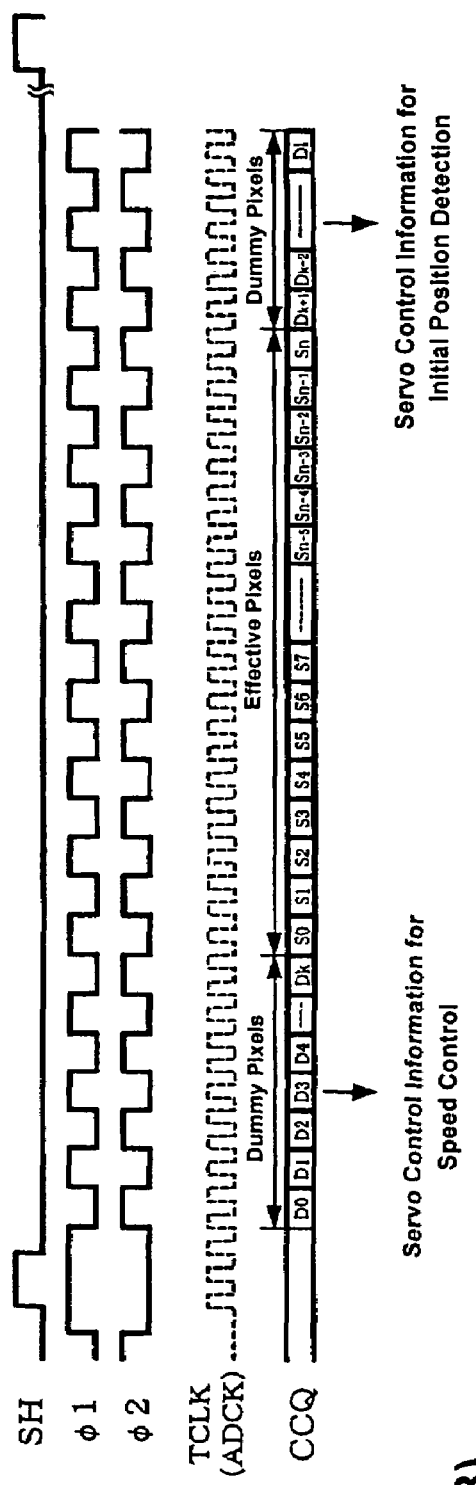
FIGS. 20(A) and (B) are timing diagrams illustrating a method for reading servo control information by dummy pixel regions according to another embodiment of the invention.
Figure 20:
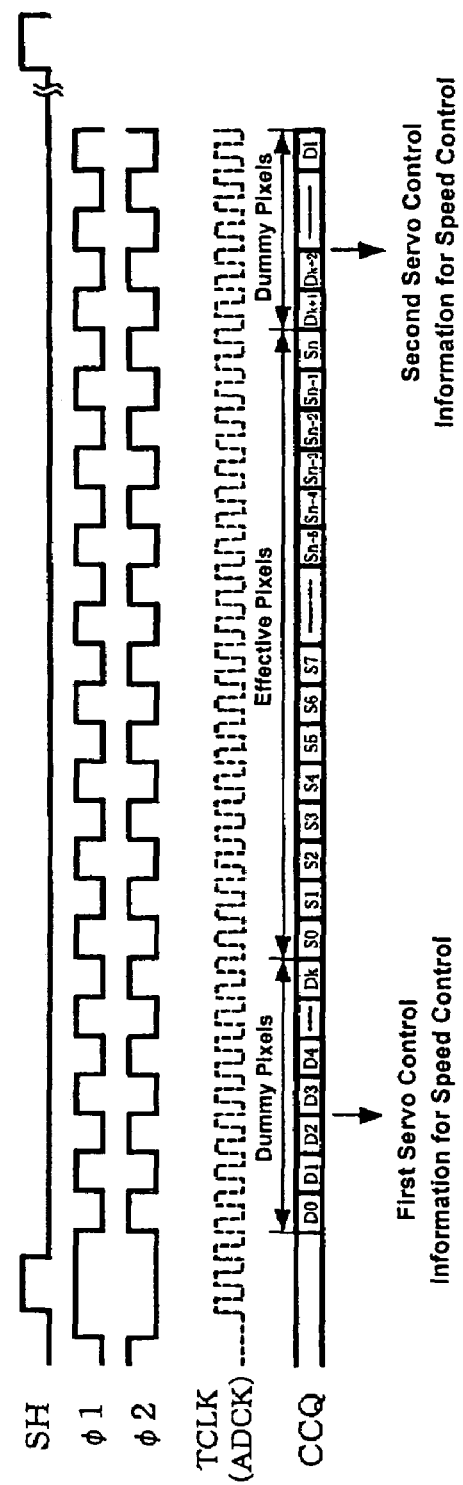

Also, as indicated in FIG. 20(A), data obtained by the dummy pixel region ($D_0$-$D_k$) on one end side may be used as servo control information for speed control, and data obtained by the dummy pixel region ($D_{k+1}$-$D_1$) on the other end side may be used as servo control information for initial or other position detection. By so doing, servo control information on the printed matter 16 in FIGS. 4 and 6(A) is read using the dummy pixel region (first pixel region) on one end side, such that the servo control for speeds can be performed. And, servo control information on the printed matter 18 is read using the dummy pixel region (second pixel region) on the other end side, such that the servo control for initial position (home position) can be performed.

It is noted that, in FIG. 20(A), data obtained by the first and second regions of the dummy pixel region may be used as servo control information for speed control and initial position detection respectively (see FIG. 6(B)).

Alternatively, as indicated in FIG. 20(B), data obtained by the dummy pixel region on one end side may be used as servo control information for first speed control (for example low speed), and data obtained by the dummy pixel region on the other end side may be used as servo control information for second speed (for example, medium speed, high speed).

As a result, servo control according to a first target speed range can be performed by reading servo control information on the printed matter 16-1 in FIG. 7(B) using the dummy pixel region on one end side. Also, servo control according to a second speed target range can be performed by reading servo control information on the printed matter 16-2 using the dummy pixel region on the other end side.

It is noted that, in FIG. 20(B), data obtained in the $1^{st}$-$i^{th}$ (i is an integer of 2 or more) regions of the dummy pixel region on one end side (or the other end side) may be used as servo control information for the $1^{st}$-$i^{th}$ speeds.

By reading servo control information using dummy pixel regions as described above, the dummy pixel regions, which are not necessary for reading effective image data, can be effectively used.

Also, as described above with reference to FIG. 16(B), when the clock frequencies of the shift/transfer clocks φ1, φ2 are made high in dummy pixel output periods, the A/D conversion performed by the A/D converter 40 cannot catch up the speed, and therefore correct image data cannot be obtained for the dummy pixel regions. However, the servo control information is not required to have a very high resolution compared to a resolution for reading texts, and a reading resolution that can make a determination of black or white is sufficient. Accordingly, even when the resolution in reading image data in dummy pixel regions is lowered as a result of making the clocks φ1, φ2 faster, servo control information that is sufficient for controlling the movements of the carriage 20 can be obtained. Therefore, there is an advantage that while the image reading speed can be made faster through making the frequencies of the clocks φ1, φ2 faster during dummy pixel output periods, an appropriate servo control can be realized. However, as indicated in FIG. 16(A), the clock frequencies of φ1, φ2 during dummy pixel output periods may not have to be made high.

Also, when a servo control region (speed control region, position detection region) is provided within a dummy pixel region, the clock frequencies of φ1, φ2 in servo control regions (for example, the regions D1-D4 in FIG. 19(B)) may be made slower than the clock frequency in other dummy pixel regions (for example, regions other than the regions D1-D4 in FIG. 19(B)), such that the servo control information can be more securely read.

While the invention has been described in conjunction with several specific embodiments, further alternatives, modifications, variations and applications will be apparent to those skilled in the art in light of the foregoing description. For example, the structure and composition of the various components disclosed, that is, the electronic device, electronic device controller, image sensor controller, servo controller, image sensor, and the like are not limited to those disclosed herein. In that regard, a drive mechanism for the carriage, a mechanism that is different from the one described in the present embodiment can be used. Also, methods for controlling the image sensor controller and servo controller different from those described herein can be used. Furthermore, an image sensor of a type that does not include a transfer section can also be used. Also, in addition to being applicable to image scanners, facsimiles and copiers, the present invention is also applicable to other electronic devices and hybrid devices of the aforementioned devices. Accordingly, the invention herein is intended to embrace all such alternatives, modifications, variations and applications, as may fall within the spirit and scope of the appended claims.

What is claimed is:

1. A controller for an electronic device, comprising:
   an image sensor having an effective pixel region and a dummy pixel region;
   an image sensor controller configured to control the image sensor; and
   a servo controller configured to perform servo control of a drive device that drives a carriage based on servo control information read by at least a portion of the dummy pixel region.

2. A controller according to claim 1, the dummy pixel region comprising a plurality of light receiving elements, and the servo controller is configured to perform the servo control based on servo control information obtained from the plurality of light receiving elements of the dummy pixel region.

3. A controller according to claim 1,
   the servo controller being configured to perform speed servo control on a speed at which the carriage is moved based on the servo control information speed control, and
   the servo controller being configured to perform the servo control for initial position based on the servo control information for the initial position.

4. A controller according to claim 3, the servo controller being configured to perform speed servo control according to speed ranges based on servo control information for speed control in the speed ranges.

5. An electronic device, comprising:
   an image sensor having an effective pixel region and a dummy pixel region;
   at least one servo control sensor;
   a carriage on which the image sensor and at least one servo control sensor are mounted;
   a drive device configured to drive the carriage;
   an image sensor controller configured to control the image sensor; and
   a servo controller configured to perform servo control on the drive device based on servo control information read by the at least one servo control sensor.

6. An electronic device according to claim 5, the servo control information being contained in printed matter disposed in a detection area of the at least one servo control sensor.

7. An electronic device according to claim 6, the printed matter comprising at least one barcode, each barcode including a plurality of bar intervals indicative of the control to be performed based on that barcode.

8. A controller for an electronic device according to claim 7, the printed matter comprising a plurality of barcodes each having mutually different bar intervals.

9. A method for controlling an electronic device, comprising:
   controlling an image sensor having an effective pixel region and a dummy pixel region; and
   performing servo control on the image sensor based on servo control information read by at least a portion of the dummy pixel region.

* * * * *